Figure 1:
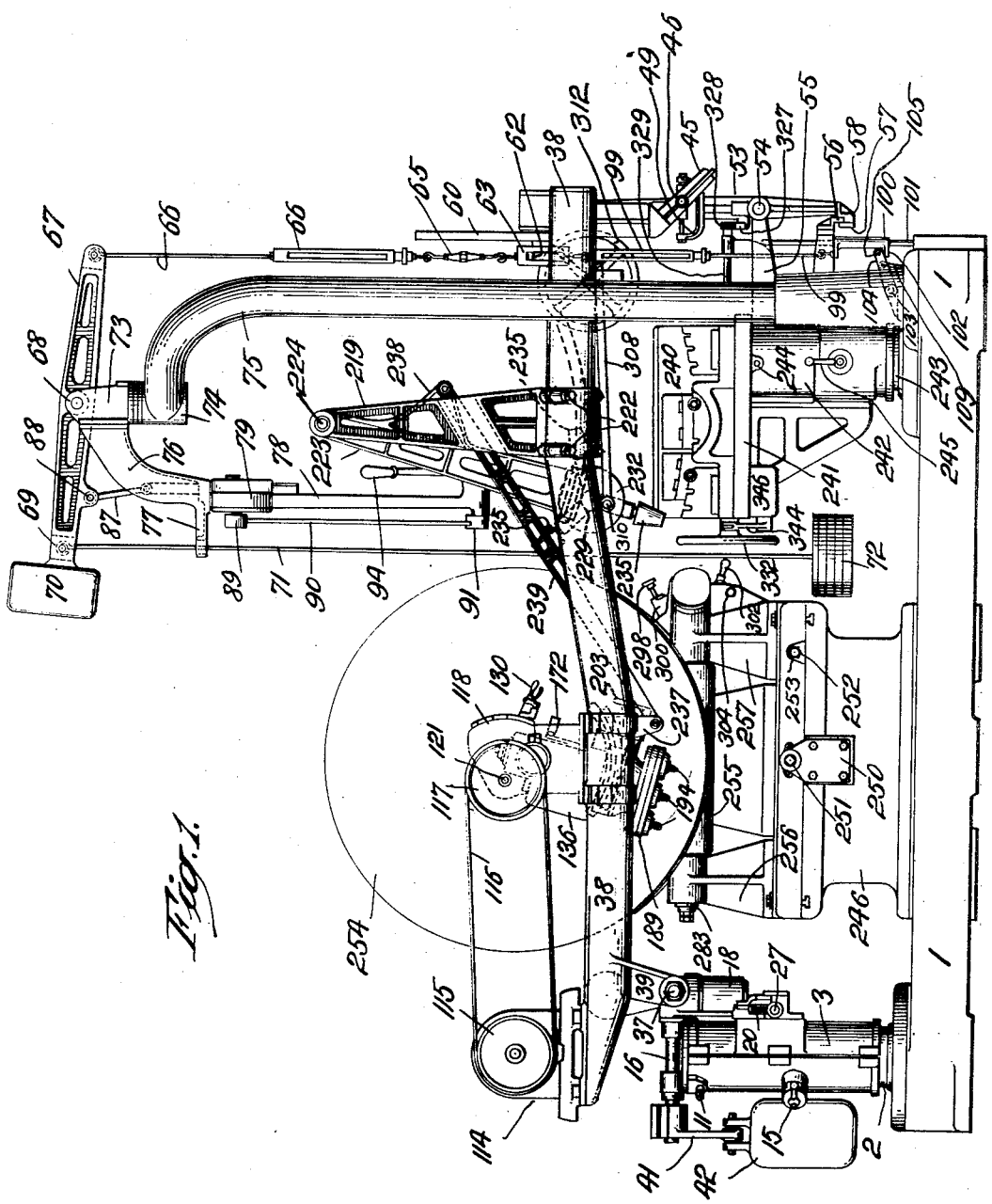

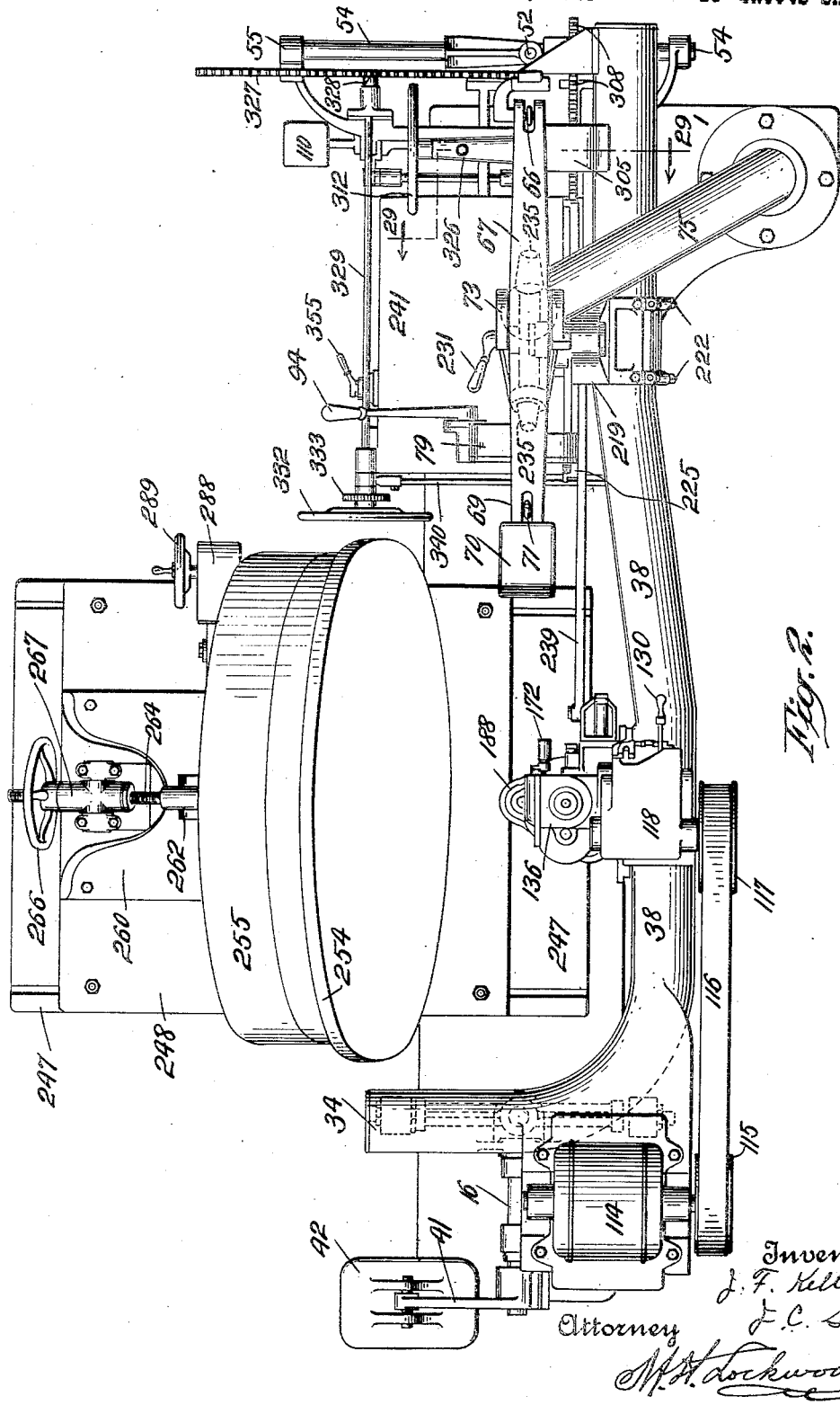

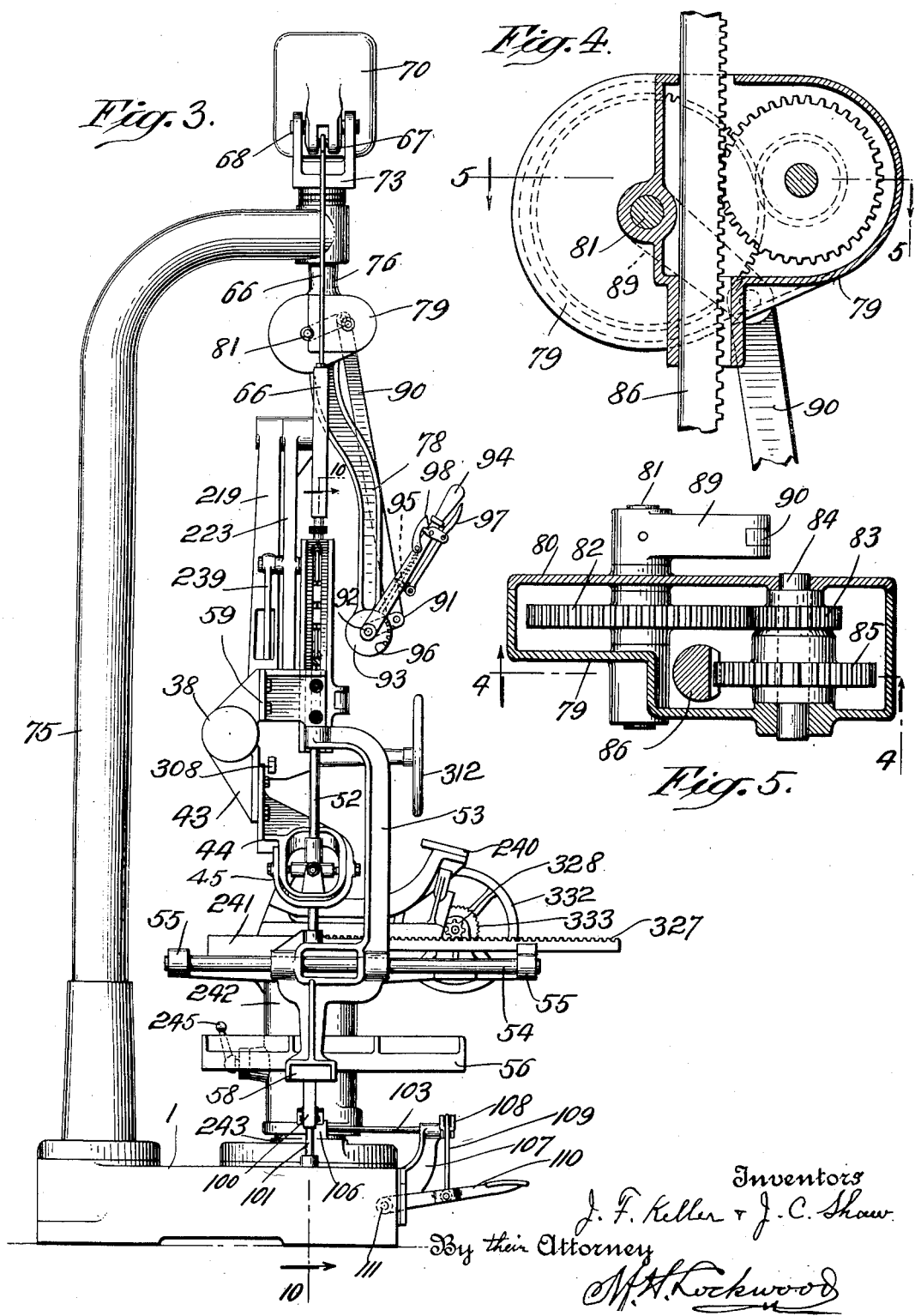

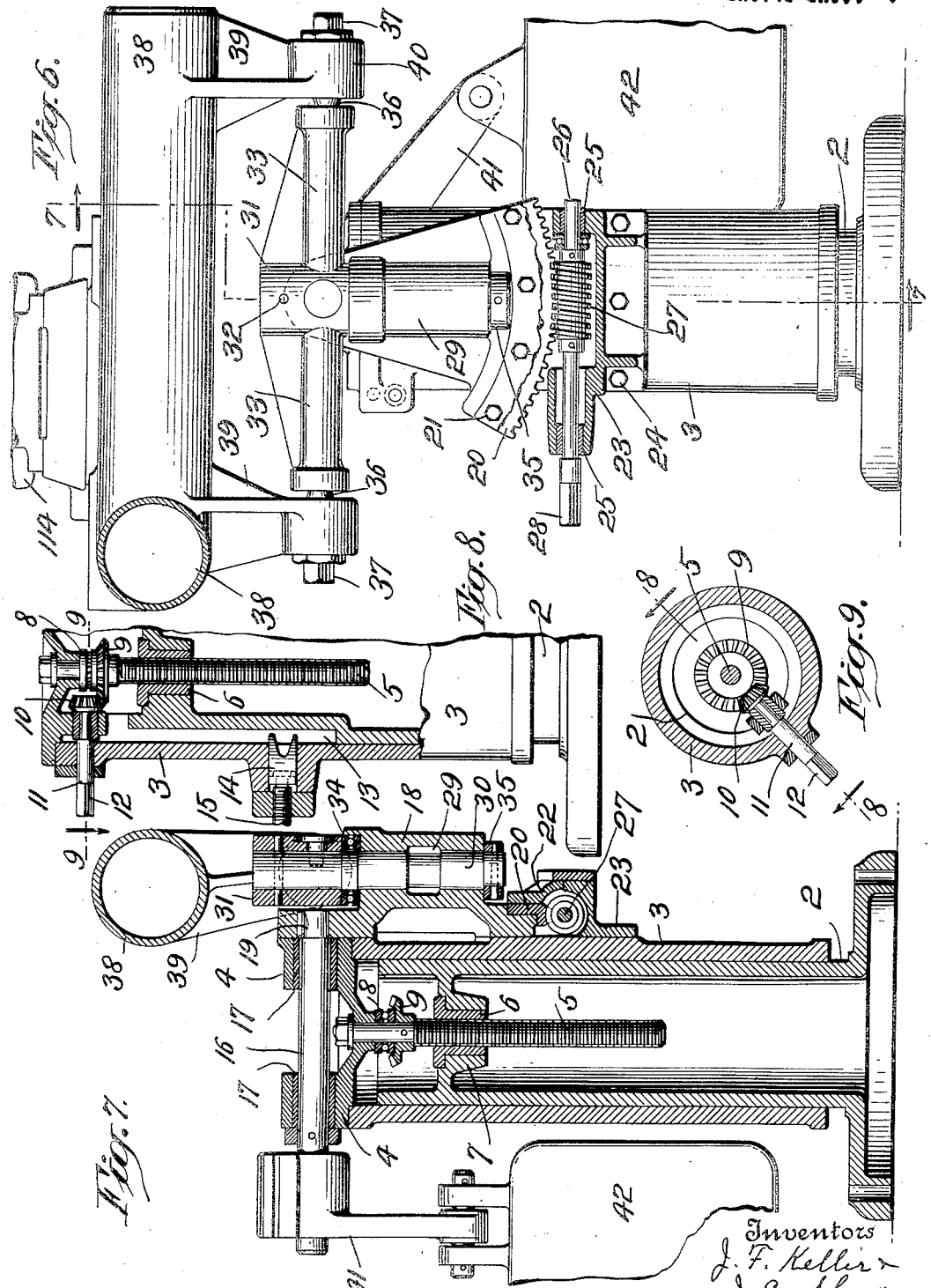

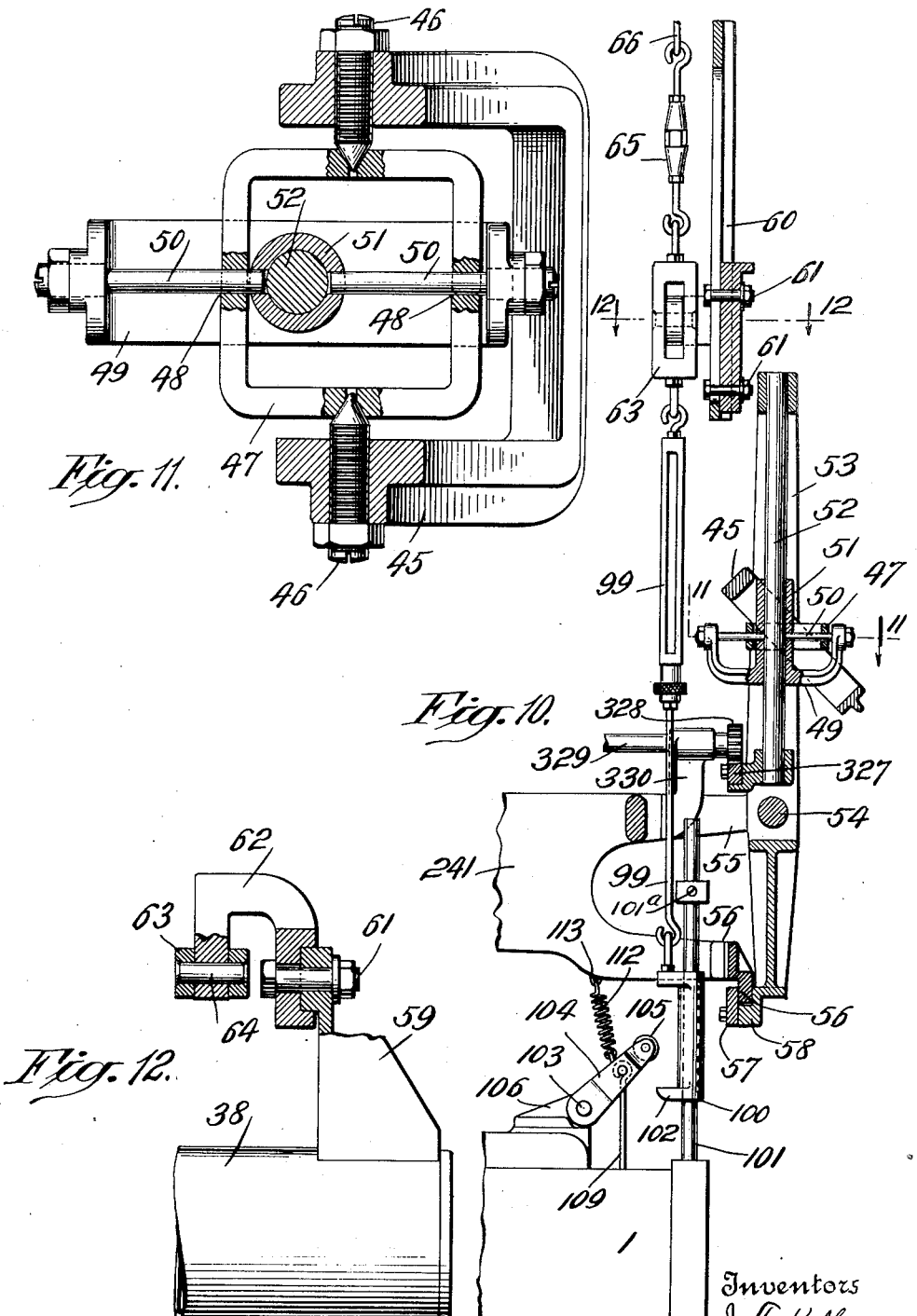

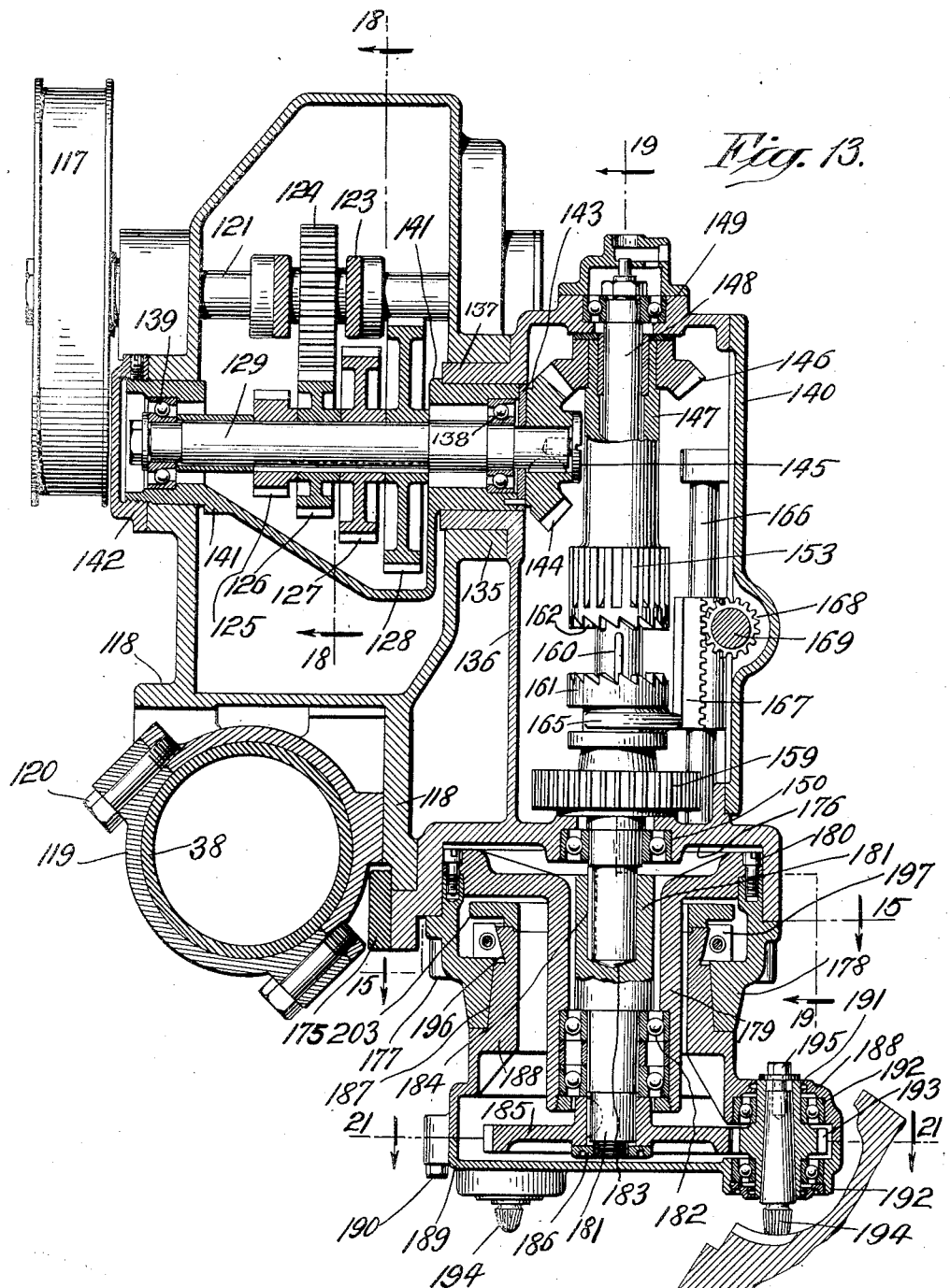

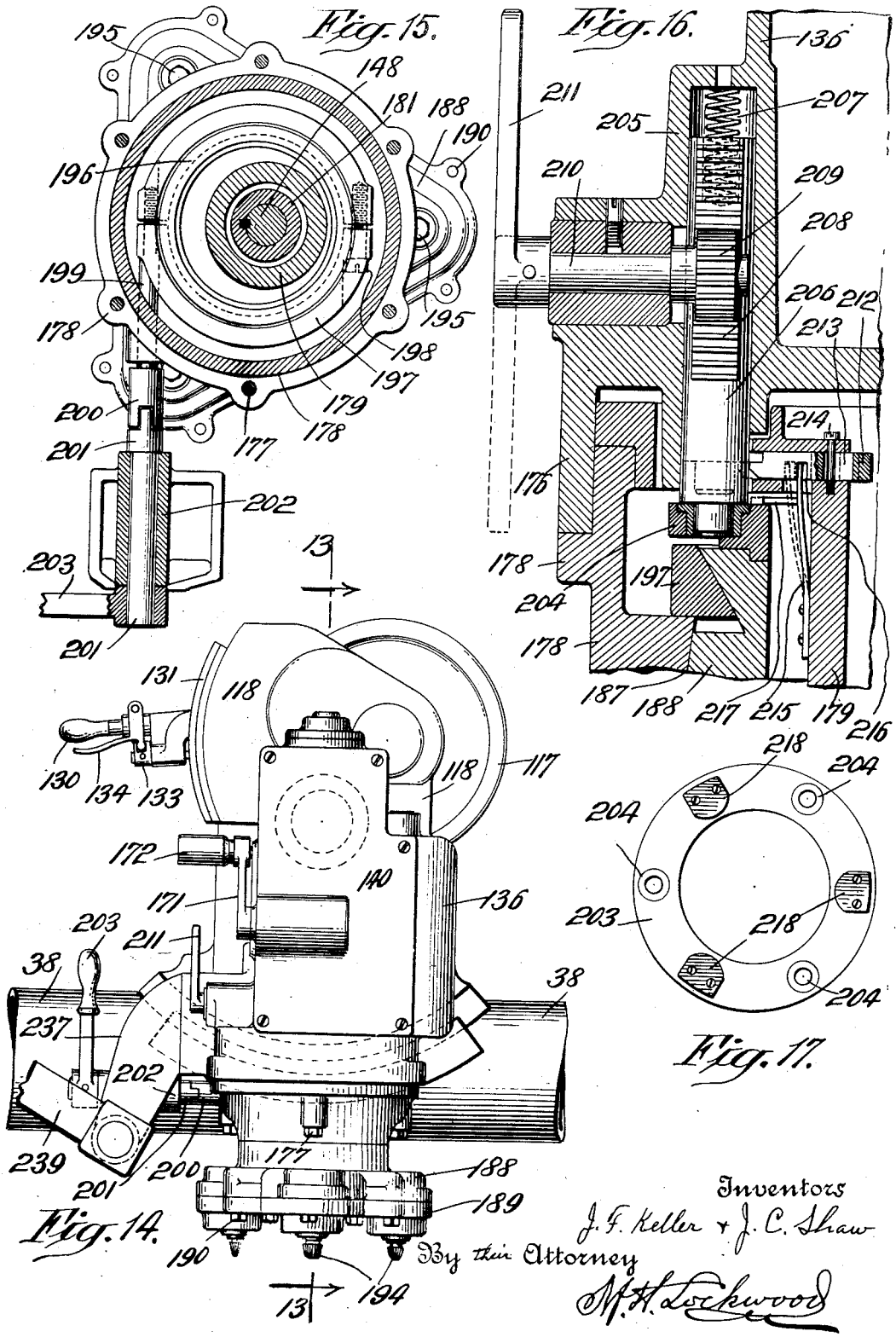

May 15, 1928.  1,669,904
J. F. KELLER ET AL
TIRE MOLD CUTTING MACHINE
Filed Oct. 5, 1921  13 Sheets-Sheet 8
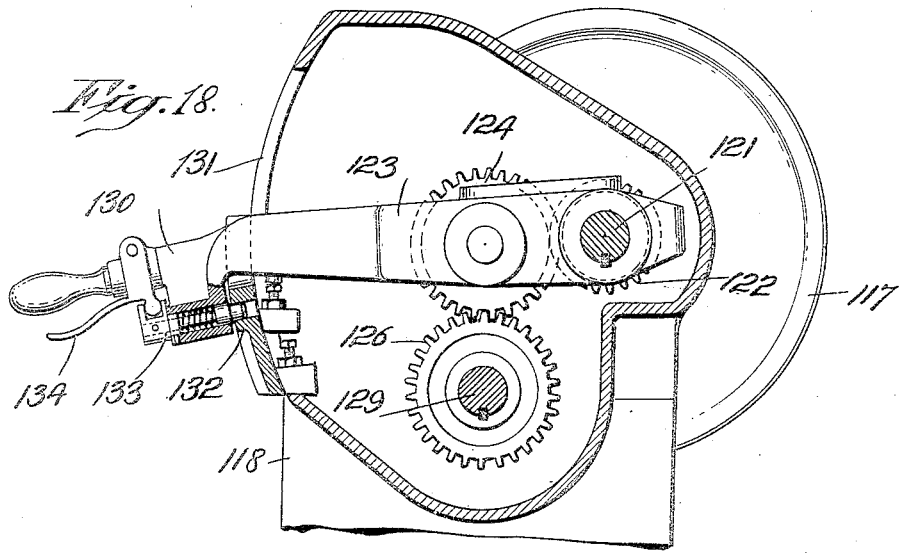
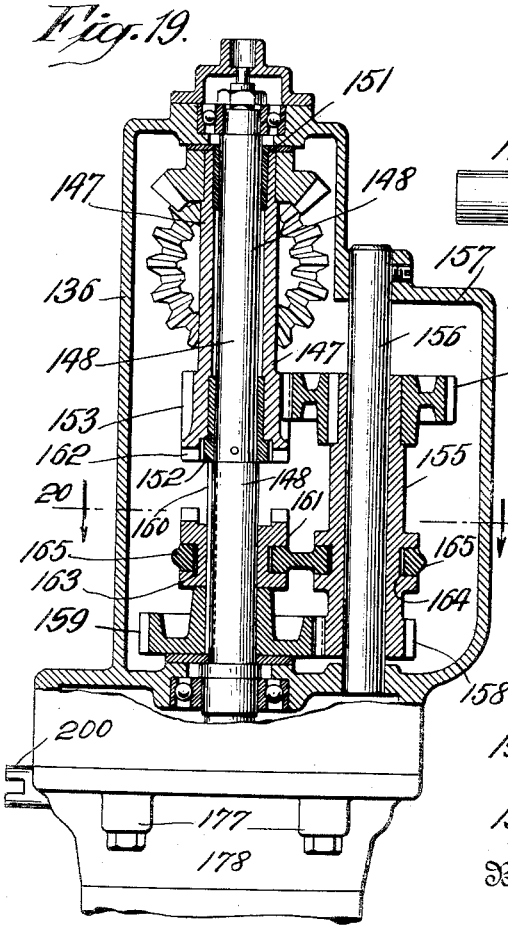
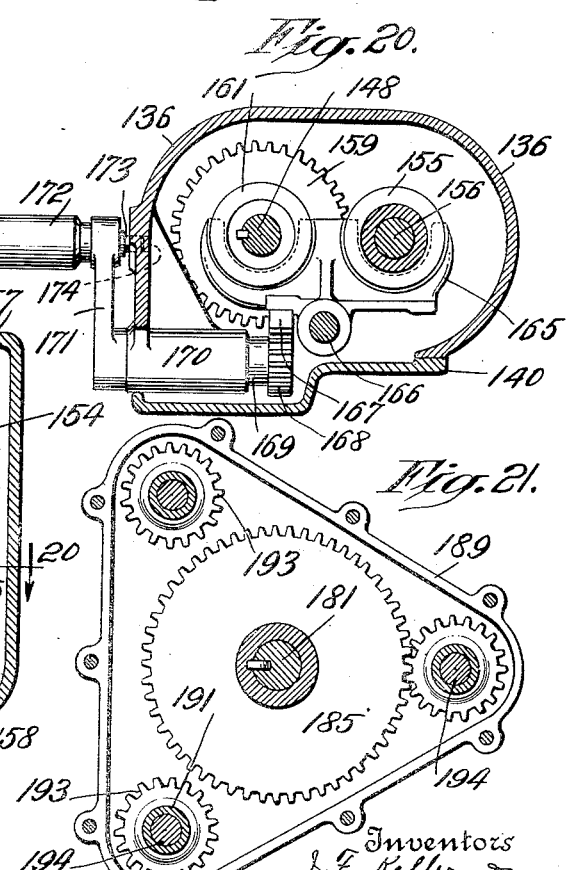
Inventors
J. F. Keller &
J. C. Shaw
By their Attorney
M. H. Lockwood

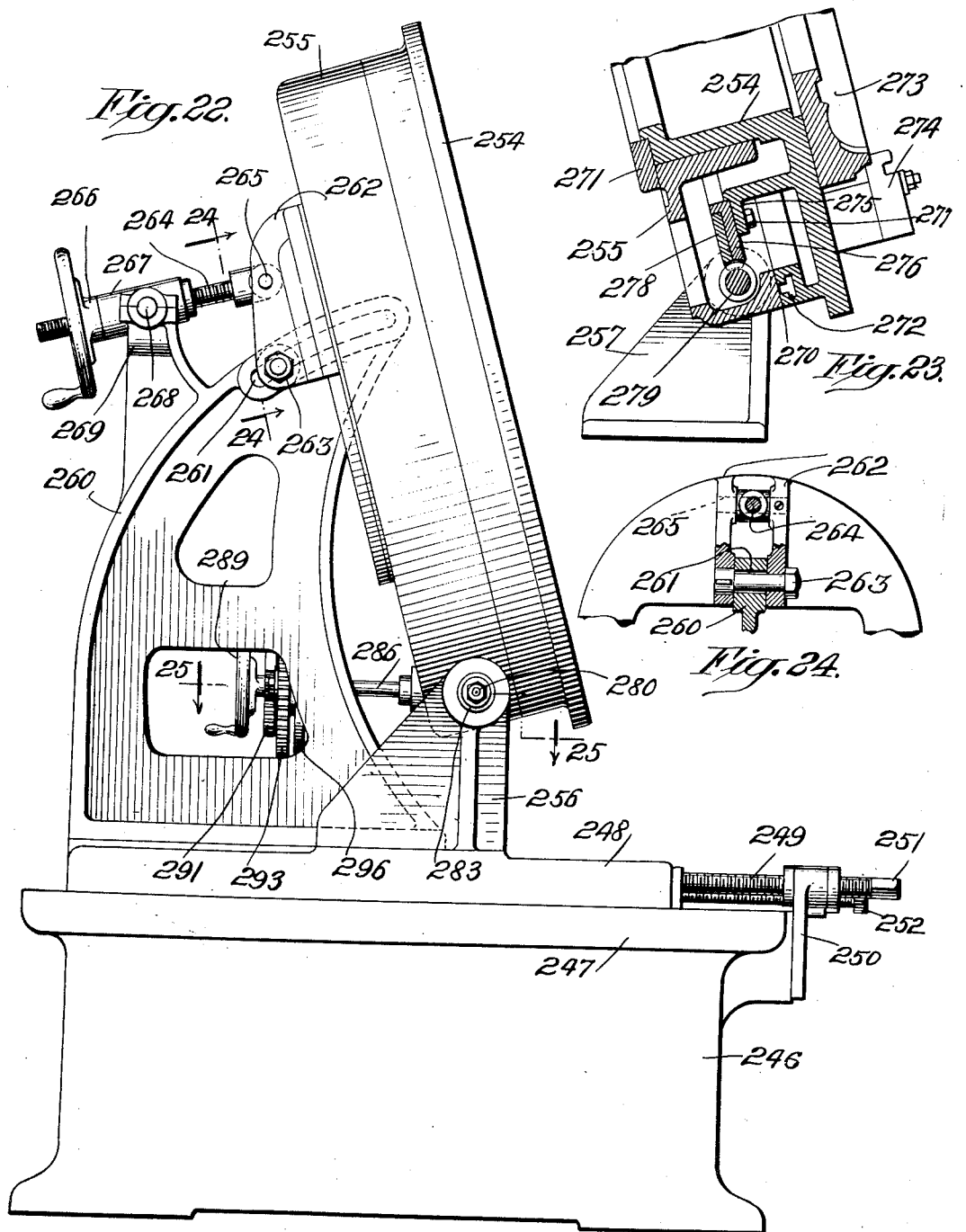

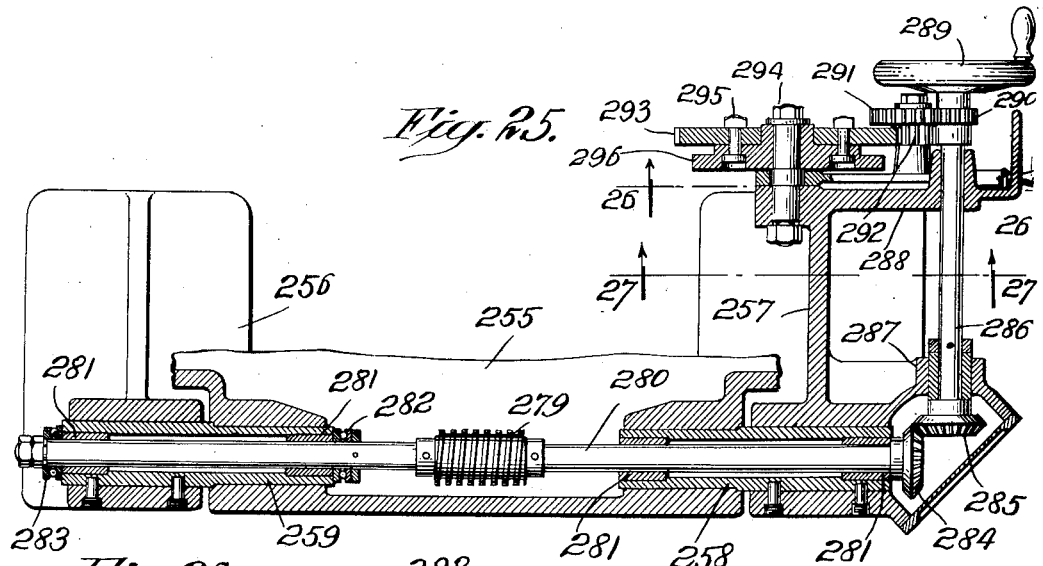
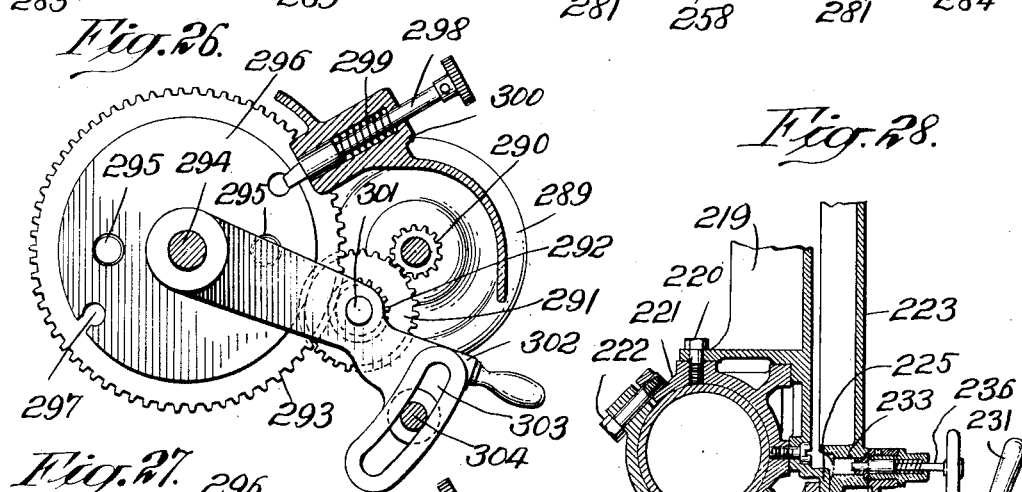
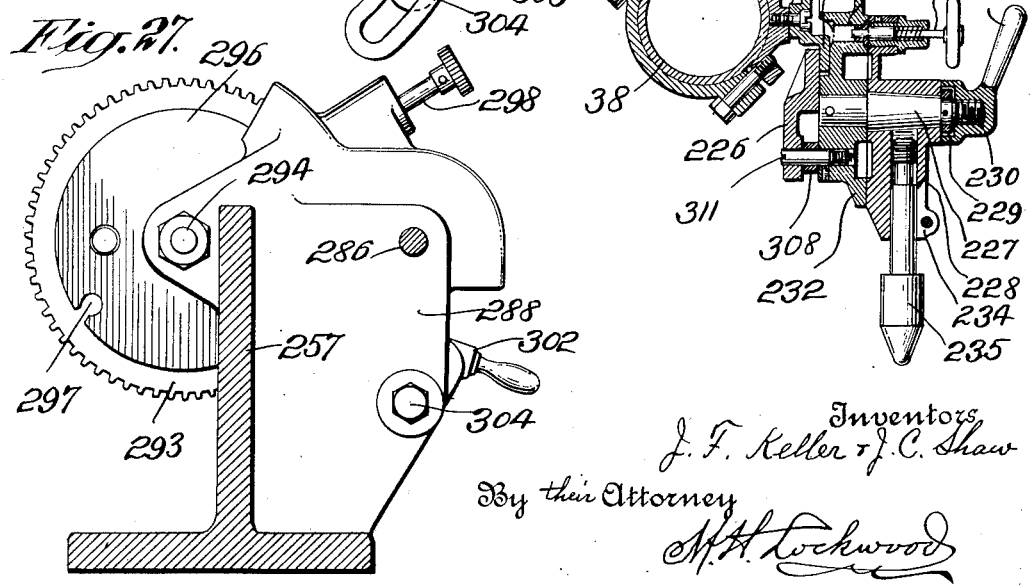

May 15, 1928.
J. F. KELLER ET AL
1,669,904
TIRE MOLD CUTTING MACHINE
Filed Oct. 5, 1921  13 Sheets-Sheet 11
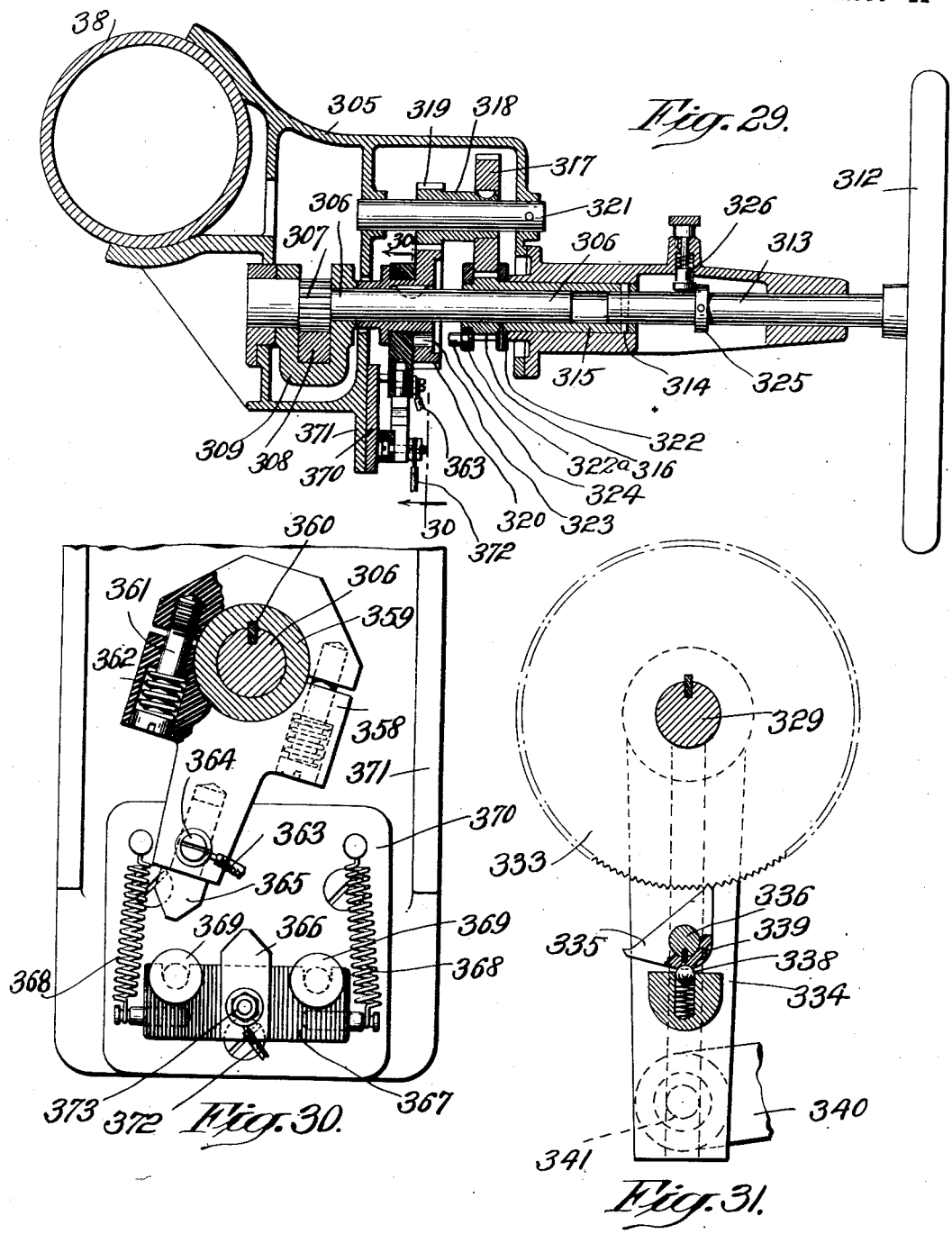

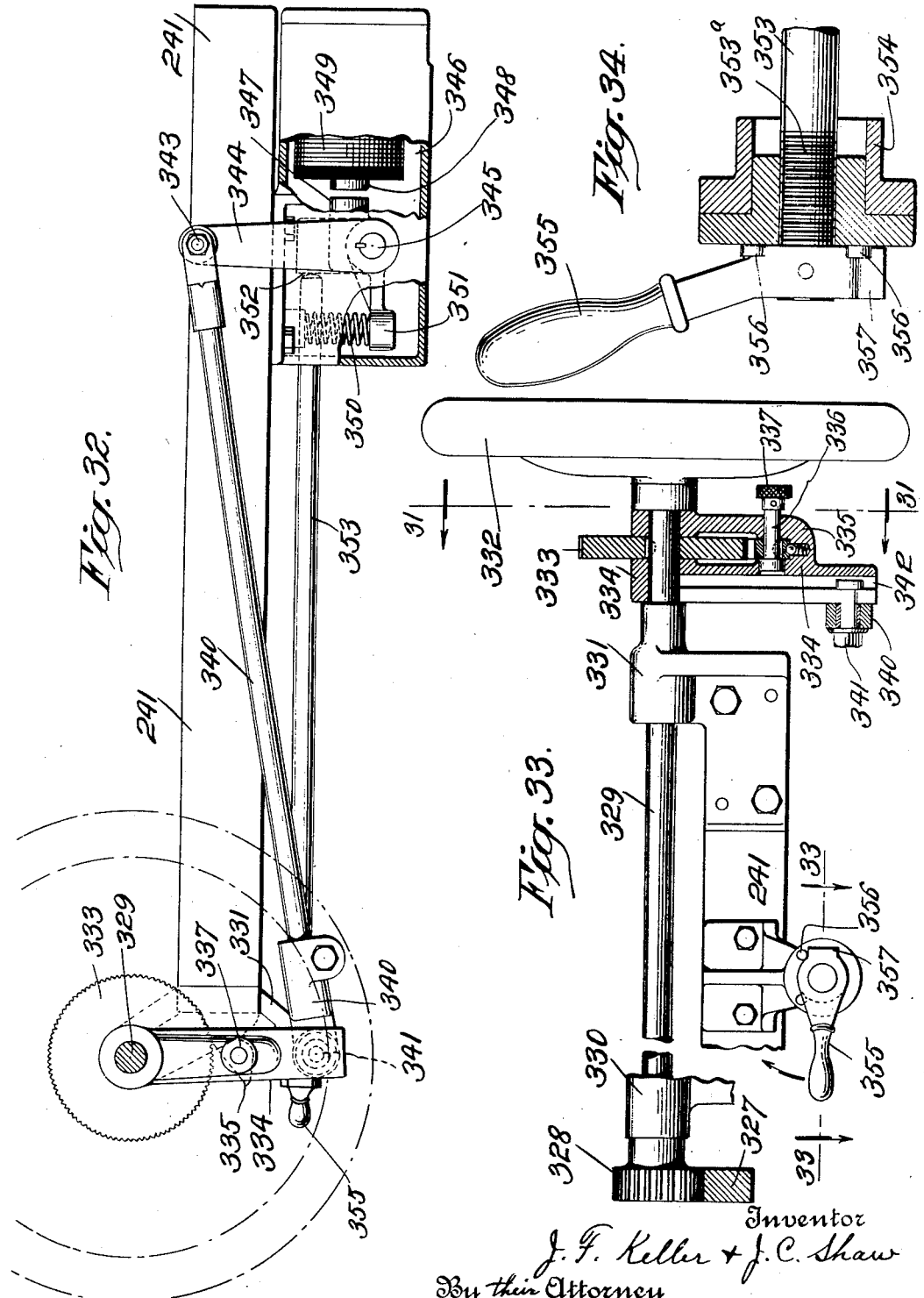

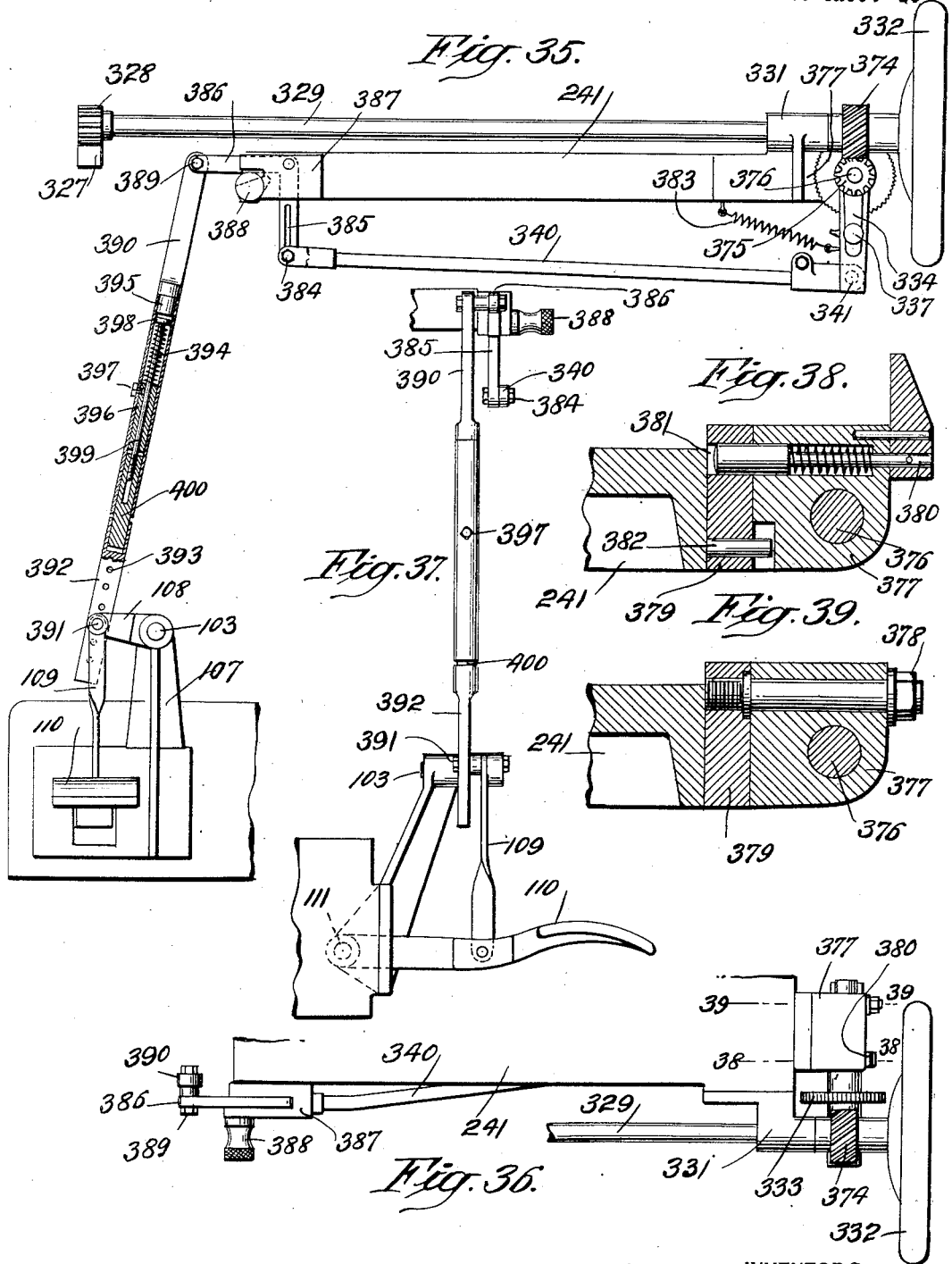

Patented May 15, 1928.

1,669,904

UNITED STATES PATENT OFFICE.

JOSEPH F. KELLER, OF NEW YORK, AND JOHN C. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

TIRE-MOLD-CUTTING MACHINE.

Application filed October 5, 1921. Serial No. 505,550.

Our invention relates more particularly to a mechanical engraving or die sinking machine, in which the die or work is operated upon by a rotating cutter and the form of the die or cut is controlled by a pattern over which a tracer is moved, the tracer and cutter being operatively connected together so that all of the positions or movements of the tracer are reproduced by the cutter. In machines of this character, it is customary to have the pattern several times larger in size than the work or die to be engraved on the machine.

Machines of this character adapted for the purpose of engraving the pattern of a tire mold for automobile tires and the like, is of necessity, a large machine, and, therefore, the problem of developing a machine that will accurately and effectively perform the work necessary with the minimum amount of attention and work on the part of the operator is extremely difficult. Machines of this character have been produced, but so far as we are aware, all such machines have been slow in operation and have required the attention of two or more attendants with the result that it would take days to complete the engraving or cutting of a large tire mold.

The object accomplished in our improved tire mold machine is that we have developed and constructed a substantially automatic machine, which can be entirely controlled by a single operator, and can be operated several times as fast as previous machines. The machine is built so strong and with so many improved adjustments and automatic features that accurate work can be turned out at very high speed, for the cutter bar and associated parts, although massive, are so delicately mounted and balanced as to be responsive to the slightest touch of the operator.

A further object is to mount the cutter bar not only with a universal pivot movement, so that the free end thereof may be moved, horizontally and vertically, but the entire universal pivot mounting of the cutter bar is mounted on a shaft or trunnion substantially parallel with the axis of the cutter and tracer, thereby providing for rotating the cutter bar and changing the angular position of the plane of the cutter and tracer.

A further object is to mount the cutter and tracer, respectively, upon brackets secured to the cutter bar in proper spaced relation from the pivoted end thereof, to give the necessary or desired reduction between the pattern and work, these brackets preferably being clamped to the cutter bar, so that they may be rotatably and longitudinally adjusted thereon and then fixedly clamped in position. In our present machine, the rackets referred to extend upward above the cutter bar and pivotally support the arms or carriers for the cutter and tracer, the cutter and tracer arms being connected together by a single link, so that both may be moved in unison.

A further object is to provide turrets for the cutter and tracer so that different cutters for roughing, heavy cutting and finishing may be rapidly and accurately brought into position for use and thereby facilitate the rapid reproduction of the pattern. In carrying out this improvement in our tire mold machine, we have provided a special cutter turret head from which the turret may be readily removed and replaced by another turret without disarranging or disconnecting any associated parts of the machine.

A further object is to provide an improved change-speed gear mechanism mounted upon the cutter bar in connection with the bracket and arm supporting the cutter turret head, the arrangement being such that a plurality of changes in speed may be at the command of the operator and the changes may be made with a minimum amount of effort on the part of the operator, and with great exactness. This is an important feature of improvement for in previous machines, any changes in speed of the cutter have usually been accomplished by belts and pulleys and, therefore, were subject to slipping of the belts, and the number and variety of changes in speed were limited. Furthermore, with gears, there is a more positive drive and for heavy and rapid cutting, gears are more reliable, and for this reason we are enabled, without improvement, to cut deeper and faster than is possible with prior machines of this character.

A further object is to mount the free end of the cutter bar in an automatically adjustable universal stirrup or gimbal connected with a counter-balance so devised that although the cutter bar and associate parts are very heavy, they may be readily moved in any direction by a light touch of the hand. In connection with this suspension and counter-balancing of the cutter bar, we preferably provide manually operated means in connection with the counter-balance for raising and lowering the cutter bar and for holding it out of operative position.

A further object is to provide means, in connection with the manually operated means for raising and lowering the cutter bar, for positively moving the cutter bar downward to operative position and holding it in that position thereby facilitating the taking of heavy cuts with the cutter without the possibility of the cutter riding out of the work, while, at the same time, compelling the tracer to follow the pattern. This is an important feature of our improved machine, and while we have shown a treadle cooperating with the free end of the cutter bar for effectively holding the cutter bar in operative position, it will be obvious that other devices may be employed for this purpose.

A further object is to provide a rack and pinion, operatively connected with the cutter bar through the universal suspension at the free end thereof for moving the cutter bar horizontally to effect the cross feed of the cutter and tracer. We have provided improved means for effecting the cross feed automatically through a ratchet and pawl, which may be operated independently or by means of the foot treadle for moving and holding the cutter bar down in operative position.

A further object is to provide a hand wheel and rack and pinion connecting link mounted upon the cutter bar and operatively connected with the tracer carrier, whereby both the tracer and cutter may be simultaneously moved for the longitudinal feed thereof. In this connection, it may be desirable to include automatic means for operating the ratchet and pawl for the transverse or cross feed of the cutter bar and we have shown how this may be done by electromagnetic means.

A further object is to provide for adjusting the work holder carrying the tire mold blank so as to vary the angle of the planes thereof with respect to the cutter bar and also to provide for rotating the work to bring different portions of the tire mold blank into the field of the cutter. In connection with the means for rotating the tire mold blank, we have incorporated an index plate and change gear, so that the circumference of the tire mold may be accurately divided and the different sections positioned for the proper reproduction of the pattern.

Other objects and improvements will be brought out in the description of our machine and it will be readily seen that with the improvements incorporated therein, we have evolved a machine which may be operated substantially automatically with the least amount of attention on the part of the operator and capable of taking heavy cuts and of high speed operation so that work that heretofore has required days to complete may be completed on our machine in a few hours.

In the accompanying drawings, Fig. 1 shows a side elevation of our improved tire mold cutting machine; Fig. 2 is a top plan view of the machine; Fig. 3 is an end elevation of the parts at the right end of the machine; Fig. 4 is a sectional detail of the gearing for manually positioning the cutter bar taken on the line 4—4 of Fig. 5; Fig. 5 is a transverse section of the same gearing taken on the line 5—5 of Fig. 4; Fig. 6 is an end elevation of the supporting column and pivoted end of the cutter bar; Fig. 7 is a vertical section of the mechanism shown in Fig. 6 taken on the line 7—7 of Fig. 6; Fig. 8 is a partial vertical section of the supporting column shown on the line 8—8 of Fig. 9; Fig. 9 is a transverse section of the column head on the line 9—9 of Fig. 8; Fig. 10 is a sectional view in side elevation of the connecting links which support the free end of the cutter bar taken on the line 10—10 of Fig. 3; Fig. 11 is a transverse sectional detail of the gimbal connected with the cutter bar on the line 11—11 of Fig. 10; Fig. 12 is a detail view in section on the line 12—12 of Fig. 10 of the connection between the link and the cutter bar; Fig. 13 is a vertical section on the line 13—13 of Fig. 14 of the change-gear transmission mechanism and the turret cutter head; Fig. 14 is a side elevation of the cutter support and its attachment to the cutter bar; Fig. 15 is a transverse section, substantially on the line 15—15 of Fig. 13, showing the means for clamping the turret in operative position; Fig. 16 is a vertical section showing the details of the locking mechanism for the turret head; Fig. 17 is a plan view of the upper annular ring of the turret; Fig. 18 is a vertical section on the line 18—18 of Fig. 13 showing the gear changing lever; Fig. 19 is a vertical section showing the details of the gear shifting drive taken on the line 19—19 of Fig. 13; Fig. 20 is a transverse section on the line 20—20 of Fig. 19; Fig. 21 is a transverse sectional view on the line 21—21 of Fig. 13 showing the gearing for the turret cutters; Fig. 22 shows a side elevation of the work supporting member; Fig. 23 is a vertical section, partially broken away through the middle of the work-holding chuck or member; Fig. 24 is a sectional view on the line 24—24 of Fig. 22 showing the details of the adjusting device for the work-holding member; Fig. 25 is a horizontal sectional view, substantially on the line 25—25 of Fig. 22, showing the hand feeding mechanism for rotating the work in the work-holder; Fig. 26 is a detail view partially in section of the index mechanism taken on the line 26—26 of Fig. 25; Fig. 27 is another transverse view taken on the line 27—27 of Fig. 25; Fig. 28 is a vertical transverse section of the turret carrying the tracer points and its connections with the cutter bar; Fig. 29 is a vertical transverse section of the hand wheel gear mechanism for the longitudinal feed of the cutter and tracer taken on the line 29—29 of Fig. 2; Fig. 30 is a sectional detail view of the contact making arm taken on the line 30—30 of Fig. 29; Fig. 31 is a sectional detail of the ratchet and pawl feed for the cross feed of the cutter bar; Fig. 32 is a view in elevation of the cross feed ratchet and pawl operated by an electromagnet; Fig. 33 is a view showing further details of the cross feed mechanism, some of the parts being shown in section; Fig. 34 is a sectional detail of the adjusting lever for changing the amount of cross feed; Fig. 35 is a side elevation of an improved cross feed mechanism; Fig. 36 is a plan view of the mechanism shown in Fig. 35; Fig. 37 is an end elevation of the same mechanism; Fig. 38 is a sectional detail on the line 38—38 of Fig. 36 and Fig. 39 is a sectional detail on the line 39—39 of Fig. 36.

Referring to the drawings, it will be seen that the machine is mounted upon a base 1 from which extending upward therefrom are various pillars and piers for supporting the different cooperating elements of the machine. The column 2 at the left of the machine as shown in Fig. 1, supports the pivoted end of the cutter bar and is more particularly shown in detail in Figs. 6 to 9 inclusive. The column 2, as will be seen in Fig. 7 of the drawings, is surrounded with an adjustable telescoping cylinder 3, the upper end of which is closed by a cap or cover 4. The telescoping cylinder 3 is adjustably supported upon and by the column 2 by means of a screw 5 operating in a nut 6, supported in a transverse partition 7 near the top of the column. The screw 5 has its upper end rotatably supported in the cap or cover 4 and thrust ball bearing 8 is provided to take the thrust of the screw against the under-side of the cap 4 of the adjustable telescoping member 3, the thrust of the bearing being taken by a beveled pinion 9 secured to the shank of the screw 5. The beveled pinion 9 cooperates with a pinion 10 (see Figs. 8 and 9) secured to a shaft 11, projecting laterally through the wall of the cylindrical telescoping member 3, and is provided with a squared end at 12 so that a wrench or crank may be applied thereto for adjusting the telescoping member 3 with respect to the column 2 to vary the elevation of the pivoted end of the cutter bar. The column 2 is preferably provided with a key slot at 13 and a clamping member and key 14 is adapted to cooperate therewith for preventing relative rotation of and rigidly securing the telescopic member to the column 2 after it has been properly adjusted. A screw 15 cooperating with the key member 14 is provided for this purpose. The head 4 of the telescoping member 3 is provided with a transversely extending trunnion or shaft 16, rotatably mounted in bearings at 17, and is adapted to support the entire weight of the pivoted end of the cutter bar. For this purpose, a bracket 18 is secured at 19 to the right end of the shaft 16 by means of a key so that both may be rotated together. The bracket 18, as indicated in Figs. 6 and 7 of the drawings, is provided with a worm gear segment 20 secured to the lower edge thereof by bolts 21, which bolts also secure thereto a segmental cover plate 22 for protecting the worm. A bracket and gib 23 is secured to the outer surface of the cylindrical telescoping member 3 by means of bolts 24, the bracket being provided with bearings 25 in which a shaft 26 is rotatably supported. A worm 27 is secured to the shaft 26 and cooperates with the worm-gear segment 20 to rotate and hold the bracket 18, together with the shaft 16 and associated parts in any desired position, as hereinafter described. The end of the shaft 26 is squared at 28 for the purpose of applying a wrench or crank thereto for rotating the worm and adjusting the position of the bracket 18 and hence the angle of the plane of the cutter and tracer.

The bracket 18 at 29 is provided with a vertically disposed bearing in which a stub shaft 30 is rotatably mounted. The shaft 30 is preferably provided with a head 31, which is provided with laterally extending arms 33, forming the horizontal pivotal support for the cutter bar. Thrust ball-bearings 34 are preferably placed between the head 31 and the bracket 18, as indicated in Fig. 7 of the drawings, and the shaft 30 is held in place by the collar and pin 35 at the lower end thereof. The ends of the arms 33, as indicated in Fig. 6 of the drawings, are preferably provided with cone sockets cooperating with the cone points 36 of the bolts or screws 37 for forming the horizontal pivotal support for the cutter bar 38 which, as indicated in Figs. 2 and 6 of the drawings, may be tubular. The pivoted end of the cutter bar 38 is preferably bent, substantially at right angles to the cutter bar, as will be seen by an examination of Fig. 2 of the drawings, and brackets 39 are secured thereto and provided at their lower ends with bosses or lugs 40, through which the bolts or cone bearing screws 36—37 are passed for pivotally supporting the cutter bar 38 to permit the free end thereof to swing in a vertical plane. It will be seen that in this manner the cutter bar 38 is mounted for pivotal movement not only in a vertical plane, but may be simultaneously moved in a horizontal plane around the axis of the shaft 30. In addition to this, the cutter bar as a whole, may be rotated about the axis of the trunnion or shaft 16, by means of the worm gear 20 and worm 27, and thus change the angular position of the cutter bar and the cutter and tracer carried thereby. It will be noted that the cutter bar in the present machine is preferably located off-center with respect to the shaft 16 and for this reason, we preferably secure to the left end of the trunnion or shaft 16 a lever arm 41, extending rearwardly, as indicated in Fig. 2 of the drawings, and provided with a heavy counterweight 42 for counter-balancing the weight of the cutter bar and associated parts and facilitating ease of rotation thereof by the worm screw 27.

The cutter bar 38, as will be seen in Figs. 1 and 2 of the drawings, extends longitudinally of the base of the machine and the free end thereof is provided with a bracket 43, as indicated in Fig. 3 of the drawings, which is secured to the cutter bar and has removably attached thereto a bracket 44, which preferably has a gimbal supporting ring 45 integral therewith and extending at an angle of about 45° to the axis of the cutter bar 38, as indicated in Figs. 3, 10 and 11 of the drawings. The gimbal supporting ring 45 is provided with cone bearing screws 46, which pivotally support the gimbal ring 47, as indicated in Fig. 11 of the drawings. The gimbal ring 47 is provided with bearing holes at 48, at right angles to the pivot cone bearing screws 46 and the gimbal member 49, by means of the pivot rods 50 is slidably and pivotally mounted upon and supported by the gimbal ring 47, thus providing for the circular movement of the end of the cutter bar 38. The inner ends of the pivot rods 50 are supported in a collar 51 slidable vertically on the rod 52 as indicated in Figs. 3, 10 and 11 of the drawings. From this mounting, it will be seen that the free end of the cutter bar 38 is supported in the gimbal ring for movement horizontally and vertically and may be rotated bodily about the axis of the trunnion or shaft 16 while keeping the free end of the cutter bar at all times under control of the operator. The rod 52 is supported in its vertical position by means of a bracket 53, which is slidably mounted upon a rod 54 extending horizontally transversely of the cutter bar 38.

The rod 54 is supported from the base of the machine by arms 55 as indicated in Figs. 3 and 10 of the drawings, and the rod 52 is held in vertical position by means of a slide 56 and gib 57 cooperating with the lower end 58 of the bracket 53, as indicated in Fig. 10 of the drawings. Thus it will be seen that by moving the bracket 53 on the rod 54, the horizontal position of the cutter bar may be varied through the gimbal connection between the rod 52 and the cutter bar, as previously indicated.

The free end of the cutter bar 38, as indicated in Figs. 3 and 12 of the drawings, is provided with another upwardly and laterally extending bracket 59 secured thereto, to which is secured a vertically adjustable slide member 60 by means of bolts and nuts 61, as indicated in Figs. 10 and 12 of the drawings. The adjustable member 60 is provided with a laterally extending arm 62 to which is pivoted a link 63 by means of the pivot 64 as indicated in Fig. 12 of the drawings. The link 63 is connected by means of the adjustable nut link 65 and links 66 with the right end 67 of a rock arm or beam pivotally supported on a horizontal pivot at 68, as indicated in Figs. 1 and 3 of the drawings. The opposite end of the rock beam 69 is provided with a counterweight 70 adapted in part, by means of the connecting links 63—65—66, to counter-balance the weight of the cutter bar 38. Preferably we have secured to the end 69 of the beam a depending rod 71 carrying at its lower end additional weights 72, which may be added or taken off at will to vary the downward pressure of the cutter bar and its associated parts according to the requirements for the particular job in the machine. The pivot 68 of the rock beam 67—69 is supported in a swivel bracket 73 rotatably mounted in a vertical bearing 74 at the upper end of a post or column 75 extending upward from the base 1 of the machine, as indicated in Figs. 1, 2 and 3 of the drawings. It will be noted that the post or column 75 is located on the base 1 considerably forward of and out of the field of the free end of the cutter bar 38 and the upper end of the post is curved over so that the cutter bar 38 and the swivel bearing 74 lies substantially in a vertical plane through the links 63—65—66.

The swivel bracket 73, as indicated in Fig. 1 of the drawings is provided with a laterally and downwardly extending arm 76, which may be provided with a finger extension 77 provided with a hole through which the rod 71 passes loosely for guiding the rod and counter-weight thereon. Primarily the bracket 76 is provided with a downwardly extending arm 78 and a recess or cavity at 79, in which rack and pinion operating connections may be mounted.

The box-like cavity 79 in the depending arm 76—78 is more particularly shown in Figs. 4 and 5 of the drawings. The box or cavity 79 is covered or enclosed by the cover plate 80, and shafts extend between the walls 79 and 80, the ends of which have bearings therein. One of the shafts 81 has secured thereto a gear 82 which meshes with a pinion 83 secured to the shaft 84, which in turn also carries a larger gear 85, the latter engaging a rack 86, slidably mounted to move up and down through the box 79 as indicated in Figs. 4 and 5 of the drawings. The rack 86 is connected at its upper end by means of a link 87 (see Fig. 1) with a lug or projection 88 on the underside of the arm 69 of the rock beam, carrying the counter-balance weights for the cutter bar, as hereinbefore described. The shaft 81, as indicated in Figs. 3, 4 and 5 of the drawings, is provided with a forwardly extending crank arm 89, which is pivotally connected by a link 90 with an arm 91, secured to a rock shaft 92, rotatably mounted in a bearing 93 formed on the lower end of the depending arm 78, as indicated in Fig. 3 of the drawings. The rock shaft 92 is also provided with a hand lever 94 which is provided with a sliding latch bolt 95 cooperating with notches 96 in the disc-like end of the bearing 93 and a pivoted lever 97 is mounted on the hand lever 94, and connected for operating the bolt 95 to release it from the notches 96 so that the hand lever 94 may be moved. Moving the hand lever 94 and through it the connecting link 90 and gears 82—83—85 and rack 86, the rock beam 67—69 may be rocked about its bearings 68 and thereby raise and lower the cutter bar 38 in a vertical plane. In this manner, it will be seen that by pulling downward on the hand lever 94, the cutter bar 38 may be lifted out of operative position or above the work and held in that position, by allowing the bolt 95 to enter one of the notches 96. When it is desired to lower the cutter bar 38 into working position and allow it to remain free to move up and down in following the pattern, the latch lever 97 may be locked by a pawl 98 so as to hold the bolt 95 out of engagement with any of the notches 96.

Obviously, the counter-balancing weights 72 may be so adjusted that when the hand lever 94 is freed by releasing it from the notches 96 the cutter bar 38 will be lifted from operative position and out of contact with the pattern and work, and a collar 101ᵃ on the upper end of the rod 101 may be provided to limit the upward movement thereof. It is also desirable when the counter weights are adjusted as just described to be able to quickly and positively move the cutter bar into operative position and to hold it in that position with the cutter against the work and the tracer following the pattern, and for this purpose we preferably connect the link 63, which, it will be remembered, is pivotally connected through the slide 62 and bracket 59 with the cutter bar 38, by means of a link 99 with a sliding tubular member 100, mounted for vertical sliding movement on a rod 101 extending upward from the right end of the base 1, as indicated in Fig. 10 of the drawings. The tubular member 100 is provided with a laterally projecting lug 102 and a transversely extending rock-shaft 103, supported on the frame of the machine, is provided with a lever arm 104 carrying a roller 105 for cooperation with the lug 102, when the shaft 103 is rocked or partially rotated. As will be seen more particularly in Fig. 3 of the drawings, the shaft is supported at one end in a bearing 106 on the base 1 of the machine, the other end being supported in a bearing on the upper end of a bracket 107 secured to the side of the base 1. The outer end of the shaft 103 is provided with a rock arm 108 connected by means of a link 109 with a treadle or foot lever 110, pivoted at 111 to an extension lug on the bracket 107, as indicated in Figs. 3 and 37 of the drawings. A spring 112 is preferably connected with the link 104 and to a fixed portion of the machine as at 113, for the purpose of holding the rock shaft 103 and arm 104 in the position indicated in Fig. 10 of the drawings, with the roller 105 out of contact with the lug 102, thus leaving the cutter bar free to move in a vertical plane. It will be understood, however, that when it is desired to positively move the cutter bar down into operative position and to hold the cutter and tracer in active engagement respectively with the work and pattern, the foot treadle 110 may be operated, thereby forcing the roller 105 into contact with the lug 102 and sliding the tubular member 100 down the rod 101 and, through the link 99, drawing the cutter bar down to operative position. By holding the foot on the treadle, the pressure may be so controlled by the operator that heavy cuts may be taken with the cutter without permitting the cutter to chatter or crawl out of the work. This is an important advantage secured by our improvement for it enables high speed work, for heavier cuts may be taken.

The cutter bar 38 carries the tracer and cutter, the latter being rotatable. For rotating the cutter we preferably mount upon the cutter bar 38, back of the pivot thereof, as indicated in Figs. 1 and 2 of the drawings, an electric motor 114, provided with a pulley 115, which may be connected by means of a belt 116 with a pulley 117, which is preferably connected, through suitable intermediate gear mechanism, for rotating the cutter at the desired speed. The cutter may be mounted in any suitable manner and supported in a cutter carrier of any preferred construction, but in our present machine, we preferably mount upon the cutter bar 38 a bracket 118, as indicated in Figs. 1, 13 and 14 of the drawings, the bracket being clamped to the cutter bar by a split collar 119 and bolts 120 so that the radial position of the bracket may be properly adjusted. The bracket 118 is preferably cast hollow and forms a gear box for a change-speed gear mechanism. The driven pulley 117, as indicated in Figs. 1 and 3 of the drawings, is mounted upon a shaft 121, passing through the gear box bracket 118 at right angles to the axis of the cutter bar 38. A pinion 122 (see Figs. 13 and 18) is keyed and slidably mounted upon the shaft 121 in a fork 123. The pinion 122 meshes with an intermediate pinion 124, rotatably mounted in the fork 123, as indicated in Fig. 18 of the drawings, and is adapted to be brought into mesh with one of the gears 125, 126, 127 and 128, which are of different sizes and keyed to a shaft 129, as indicated in Figs. 13 and 18 of the drawings. The fork 123 is provided with an outwardly extending arm forming a hand lever 130, the latter passing through a stepped slot 131 in the side wall of the gear case bracket 118. The bracket at 132 is provided with holes cooperating with a plunger bolt 133 mounted upon the hand lever 130 and operated by a finger lever 134, the device being adapted to hold the fork in the desired position with the gear 124 in engagement with one or the other of the gears 125 to 128 on the shaft 129. The gears 125 to 128 being of different diameters, it is possible to vary the speed of the shaft 129 by shifting the gear or pinion 124 into engagement with one or the other of the change-speed gears 125—126—127 or 128.

The bracket gear box 118 is preferably provided with a boss 135 having an opening or bore forming the bearing of the cutter arm 136, which is provided with a similar boss 137, extending into the boss 135 and rotatably mounted therein, as indicated in Fig. 13 of the drawings. The shaft 129 is rotatably mounted in the casing 118 by ball bearings 138 and 139, so as to rotate axially of the bearing 135—137, supporting the swinging cutter arm 136, the shaft 129 passing through the annular opening in the bosses 135 and 137 and terminating within the cutter arm 136 which is formed hollow or box-like and is enclosed or covered by a cap 140. The shaft 129 and bearings 138 and 139 may preferably be supported in a special tubular casting 141 and held in place by the cap 142 and a disc 143, as indicated in Fig. 13 of the drawings. The end of the shaft 129 which extends into the cutter arms 136 is preferably provided with a miter gear 144 keyed thereto and held in place by a suitable screw as 145. The miter gear 144 meshes with a similar miter gear 146, secured to a tubular shaft 147 rotatably mounted upon a shaft 148 extending longitudinally of the cutter arm 136, as indicated in Fig. 13 of the drawings. The shaft 148 is provided with ball-bearings at 149 and 150 and is adapted to be rotated for rotating the cutter. As will be seen in Fig. 19 of the drawings, the tubular shaft 147, as previously stated, is rotatably supported on bearings 151 and 152 on the shaft 148 and is provided at its lower end with a spur pinion 153 engaging a gear 154 keyed to a sliding collar 155, slidably mounted upon a rod 156 passing vertically through a lateral extension 157 of the cutter arm 136 as indicated in Fig. 19 of the drawings. The tubular shaft 155 is therefore rotatable upon the rod 156 and the lower end thereof is provided with a pinion 158 meshing with a gear 159, which is slidably mounted upon the shaft 148, the latter being provided with a key at 160 to cause the gear 159 and shaft 148 to rotate in unison while permitting a shifting of the gear 159, longitudinally of the shaft 148. Connected with the gear 159 and slidable on the shaft 148 and key 160 is a clutch member 161 provided with crown teeth adapted to engage the crown teeth 162 on the lower end of the tubular shaft 147, when the gear 159 and clutch 161 are shifted upwardly, longitudinally of the shaft 148, from the position indicated in Fig. 19. The clutch member 161 is provided with an annular groove at 163 and the tubular shaft 155 is provided with a similar annular groove 164 and a slidable fork 165 engages both annular grooves, as indicated in Figs. 19 and 20 of the drawings. The fork 165 is slidably mounted upon a rod 166 extending parallel to the shaft 148 and the rod 156, so that the fork 165 may slide thereon to move the gear 154 out of mesh with the pinion 153 (see Fig. 19) and simultaneously engage the clutch 161 with the clutch teeth 162 on the end of the tubular shaft 147, so that the miter gears 144—146 may drive the shaft 148 directly. When the back gear arrangement comprising the gears and pinions 153—154, 158 and 159 is in the position shown in Fig. 19 of the drawings, it will be seen that the pinion 153 drives through the gear 154 and pinion 158 and rotates the gear 159, keyed to the shaft 148, indirectly and at a lower speed than the direct drive when the shaft 148 is clutched to the tubular shaft 147. For sliding the fork 165 on the rod 166 the former is preferably provided with a rack at 167 engaged by a pinion 168 secured to a shaft 169, rotatably mounted in a bearing 170 in the cutter arm 136, as indicated in Fig. 20 of the drawings. A crank arm 171 is secured to the outer end of the shaft 169 and is provided with a handle 172 arranged in the usual manner as a spring pin 173 cooperating with holes 174 in the casing to hold the fork member 165 in one position or the other as may be desired.

Thus by means of the change-speed gears 125 to 128 (Fig. 13) we have the possibility of four speeds transmitted through the miter gears 144 and 146 and by means of the back gears 153—159 (Fig. 19) and the clutch 161, we have the possibility of doubling the number of speeds available, that is, by either direct drive of the shaft 148 or by driving it at reduced speed through the back gears 153—159 as previously described.

The lower end of the cutter arm 136 (Fig. 13) is held in sliding contact with the bracket 118 by a gib 175, and the lower end of the bracket is enlarged and provided with a recess bored out to form a socket 176, in which the removable turret is secured by means of bolts 177 (see Figs. 13 and 14). The removable turret head comprises an annular member 178, through which the bolts 177 pass and hence, when in the socket 176, remains fixed in position, relative to the cutter arm 136. A tubular flanged bearing member 179 is secured to the upper annular wall of the member 178 by screws 180, as indicated in Fig. 13 of the drawings. A stub shaft 181 is rotatably mounted in the tubular bearing support 179, by means of ball-bearings at 182 and the upper end of the shaft 181 is bored out at 183 to receive the lower end of the shaft 148, a key being provided at 184, so that the two shafts may rotate in unison when in the position indicated in Fig. 13. The stub shaft 181 may be, however, removed from shaft 148 when the entire turret head is removed from the socket 176 at the lower end of the cutter arm 136. The lower end of the shaft 181 is provided with a large spur gear 185 keyed thereto and held in place by a nut 186. The relatively fixed annular turret head member 178 is bored out eccentrically with respect to the tubular bearing 179 and the shaft 181, the bore being preferably conical, as indicated at 187 in Fig. 13. A rotatable turret member 188 of annular construction is provided with a conically turned seat, cooperating with the conical bore at 187 in the member 178, the turret member being provided with a plurality of suitable cutters. In the present instance, we provide for three cutters. The lower open end of the annular casting 188, forming the turret, is closed by a cover cap 189 held in place by screws 190 and between the cover cap 189 and the main portion 188 of the turret, three conical sockets 191 are rotatably mounted in ball-bearings 192, each of said sockets being provided with a pinion 193 adapted to mesh one at a time, with the gear 185 on the lower end of the shaft 181 when the turret is rotated to the proper position, as indicated in Figs. 13 and 21 of the drawings. Owing to the eccentricity of the turret, relative to the shaft 181, and gear 185, it will be readily seen (Fig. 21) that only one of the pinions 193 can be in proper mesh at a time. Each of the conical sockets is adapted to receive and hold a cutter 194, provided with a conical shank and held in place by a suitable bolt 195, as indicated in Fig. 13 of the drawings. It will be understood that the ball-bearing arrangement of the sockets 191 are such that we are enabled to make the sockets and shanks of the cutters, unusually short, which is of very great advantage in decreasing the length of the turret and providing a sufficiently steady bearing for the respective cutters.

In order to clamp the turret 188 in operative position and hold it rigidly in its conical socket 187, the upper end thereof is preferably provided with a beveled or conical seat at 196 which is surrounded by a split ring 197, the two pieces of which are held together by screws 198 and 199, as indicated in Fig. 15 of the drawings. The inner face of the split ring is beveled to fit the face 196, so that when the split ring is drawn together by means of the screws 198, 199 the rotatable turret 188 will be drawn upward and seated tightly in the conical socket 187 in the member 178, against which the split ring 197 is adapted to thrust, as indicated in Fig. 13 of the drawings. The split ring screw 199, as indicated in Fig. 15 of the drawings, is preferably extended tangentially through a hole in the annular member 178, and is provided with a slotted head 200, cooperating with a key 201 rotatably mounted in a bearing 202 cast integral with the lower end of the cutter arm 136, as indicated in Fig. 14 of the drawings, the outer end of the shaft or key 201 being provided with a hand lever 203, so that the screw 199 may be tightened from the outside of the casting of the turret head for clamping the turret rigidly in its socket. It has been explained that the turret head or annular member 178 together with the turret, may be entirely removed from the socket 176 on the lower end of the cutter arm 136 and hence the slotted connection between the head 200 of the screw 199 and the shaft 201 is adapted to permit the removal of the turret head.

In order to properly locate and hold the turret 188 in the position indicated in Figs. 13 and 21, with one of the pinions 193 in operative engagement with the gear 185, so as to rotate the desired cutter 194, an annular flange or ring 203 is preferably secured to the upper end of the annular turret member 188 and is provided with sockets or holes 204, as indicated in Figs. 16 and 17 of the drawings, the sockets being equally spaced and three in number in the present instance to correspond with the number of cutters employed. In a cast extension 205 of the cutter arm 136 (see Fig. 16) there is preferably mounted a vertically sliding rod or pin 206, the lower end of which is turned down to fit into the sockets 204, as indicated in Fig. 16. A spring 207 is provided for holding the pin 206 in engagement with the socket or for thrusting it into the socket if disengaged and resting on the annular flange 203. The spring actuated pin 206 may be provided with a rack 208 with which a pinion 209 cooperates, the pinion being secured to a shaft 210, the outer end of which is provided with a hand lever 211, which when rotated to the dotted line position, indicated in Fig. 16 of the drawings, is adapted to lift the pin 206 out of the sockets 204 against the action of the spring 207. Our improved machine is intended to be operated and controlled entirely by one man and when it is desired to change the active cutter by rotating the turret, it is found that both hands of the operator are necessarily employed in rotating the turret. Therefore, in order that the operator may have the use of both hands, we preferably provide means for temporarily holding the locating pin 206 out of engagement with one of the sockets 204, after the hand lever 211 has been rotated to release the turret. This preferably comprises a latch member or bolt 212 (Fig. 16) slidably mounted transversely of the pin 206, in a suitable bore or slot in the upper wall of the fixed tubular member 179, the bolt or latch being slotted at 213 and held in place by a screw 214. Preferably the latch or bolt 212 is actuated inward toward the pin 206 by means of a leaf-spring 215, which projects into a socket 216 in the latch, as indicated in Fig. 16 of the drawings. From this construction, it will be seen that when the handle 211 is rotated to the dotted line position in Fig. 16, the pin 206 will be raised to the dotted position, thereby permitting the inner end of the bolt or latch 212 to pass under the shoulder of the pin and hold it in elevated position against the action of the spring 207, thereby permitting the operator to use both hands for rotating the turret 188. It will be obvious that after the turret has been rotated so that the pin 206 is out of the field of one of the sockets 204, it is desirable that the pin 206 should be released so that it may engage and drop into the succeeding hole or socket 204 when the turret has been rotated the proper amount to bring the next pinion 193 into proper relation to the gear 185. In order to accomplish this, the spring 215 is preferably provided with a laterally extending lug or finger 217 (see Fig. 16) adapted to cooperate with cam blocks 218 secured to the top face of the annular flange 203, as shown in Fig. 17 of the drawings. It will thus be seen that after the operator has released the pin 206 and the latter is held in released position by the latch 212, he can rotate the turret, together with the flanged ring 203 to bring into position one of the adjacent cutters, and, as the turret is rotated, the cam 218 will engage the finger 217 and force the bolt or latch 212 out of engagement with the pin 206 thereby permitting the latter to drop down, under the pressure of the spring 207, until its lower end rises on the flange 203, so that as the next socket 204 comes into line with the end of the pin, the latter will drop into the socket and position and hold the turret with the pinion 193 in proper engagement with the gear 185.

It will be seen that the construction described and shown in Fig. 16 of the drawings, is such as to permit the removal of the entire turret head 178 out of the socket 176 in the lower end of the cutter arm 136 while the centering and holding pin 206, with its associated parts, remains on the arm 136 and thus may be utilized in connection with more than one turret and turret head.

The cutter bar 38 also carries the tracer and as indicated in Fig. 28 of the drawings, is provided with another upwardly extending bracket 219, secured by bolts 220 to a clamping collar 221 secured to the cutter bar 38 by bolts 222, the arrangement being such that the radial position of the bracket 219 may be adjusted relative to the cutter bar. The bracket 219, as indicated in Fig. 1 of the drawings, pivotally supports the tracer arm 223 on the pivot 224, the lower end of the arm 223 sliding against a segmental track 225 formed on the lower end of the bracket 219, the sliding or swinging arm 223 being held in position by a gib 226 as indicated in Fig. 28 of the drawings. A short trunnion 227 is secured to the lower end of the arm 223 and projects at right angles thereto for pivotally supporting thereon the tracer turret 228, which is adapted to rotate in a substantially vertical plane. The turret 228 is held in position by a collar 229 and the end of the trunnion at 230 is screw-threaded and a handle nut 231 cooperates therewith for clamping the turret 228 rigidly to the arm 223, when one of the tracer points is in working position. The lower end of the tracer arm 223, at 232, is disc-like in shape and is provided with three positioning holes or sockets 233. The tracer turret in the present machine is provided with three radially extending sockets 234, in which the tracer points 235 are mounted, the three tracer points corresponding with the three different cutters carried by the cutter turret on the cutter arm 136 as previously described. A spring actuated centering pin 236 is mounted in the turret 228 in position to cooperate with the holes or sockets 233 in the lower disc end 232 of the tracer arm, so as to properly position one or another of the tracers 235, in proper radial position with respect to the pivot 224 of the tracer arm. When this is done, the turret 228 may be rigidly clamped to the arm by the handle nut 231, as previously indicated. The clamping collar 221 carrying the tracer supporting bracket 219 enables the latter to be adjusted, both longitudinally and circumferentially of the cutter bar 38 to bring the plane of movement of the tracer carrier or arm 223 to coincide with the plane of movement of the cutter arm 136, which as previously described, is also adjustably secured to the cutter bar 38.

As will be seen in Fig. 1 of the drawings, the cutter arm 136 is provided with a downwardly and laterally extending lug 237 and the tracer arm 223 is also provided with a laterally extending lug 238 and the cutter and tracer arms are pivotally connected together by a connecting link 239, extending from the lug 237 of the cutter arm 136 to the lug 238 of the tracer arm 223. The pivotal connections of the connecting link 239 with the respective cutter and tracer arms are equal, or in other words, are the same distance from the axes of the respective supporting pivots 137 and 224. It will be noted, however, that the tracer arm 223 is longer than the cutter arm 136 and, in the present machine, the reduction in size on account of this difference will be three to one, but obviously any other suitable ratio may be provided for.

The tracer 235 cooperates with a pattern supported on a bracket or bed 240 mounted upon a table 241, secured to a cylindrical member 242, telescoping and slidably mounted upon a pillar 243 extending upward from the base 1 at the right end of the machine, as indicated in Fig. 1 of the drawings. The arrangement between the pillar 243 and the telescoping member 242 is substantially the same as that shown in Figs. 7 and 8 of the drawings, for the telescoping member 3 on the pillar 2 supporting the pivoted end of the cutter bar 38, and need no further description.

Similarly an adjusting screw 244 is provided for raising and lowering the table 241 and a similar hand lever 245 is provided for clamping the table in adjusted position. The telescoping member 242 also supports the laterally extending brackets or arms 55, as indicated in Figs. 1 and 10 of the drawings, which form the support for the crossfeed member 53, for moving the cutter bar 38 horizontally.

The base 1 of the machine is extended rearwardly as indicated in Fig. 2 of the drawings, and provided with a pier 246 upon which a slide bed 247 is provided as indicated in Fig. 22 of the drawings. A slide 248 is mounted upon the bed 247 and connected by means of a screw 249, with a bracket 250 on the bed, the screw being provided with a square end 251, so that a wrench or crank may be attached thereto for moving the slide 248 back and forth on the bed 247. An additional screw 252 is mounted in a bracket 253, also secured to the bed 247 to serve as a limiting stop to limit the forward movement of the slide 248. Upon the slide 248 and preferably cast integral therewith are a number of upwardly extending brackets for supporting thereon the work holder 254. In the present machine, the work-holder 254 comprises an annular ring rotatably mounted in an annular supporting member 255, the latter being pivotally supported on the brackets 256 and 257, by means of tubular trunnions 258 and 259, as indicated in Fig. 25 of the drawings. In this manner, it will be seen that the annular or circular work-holder 254 for holding the tire-mold blank is pivoted on an axis tangential thereto, and the angular position of the plane of the work relative to the cutter bar may be changed by rotating the member 255 about the pivots 258—259. Immediately back of the center of the work-holder the slide 248 carries an additional bracket 260 which is provided with a circumferential slot 261 concentric with the axis of the bearings 258—259. A rearwardly extending arm 262 is secured to the rear of the member 255 and is provided with a bolt passing through the slot 261, when the work is adjusted in proper position, the work-holder 254—255 may be clamped in adjusted position by the bolt 263. A screw 264 is also pivotally secured at 265 to the arm 262 and a hand wheel 266, the hub of which, acting as a nut is rotatably held in a tubular member 267 which is supported on trunnions 268 and pivotally mounted in an arm 269 on the bracket 260. From this construction, it may readily be seen that by rotating the hand wheel, the plane of the work supporting member 255 may be readily adjusted to the desired position and clamped, as previously stated, by the bolt 263.

The annular work holder 254 is rotatably mounted in the annular member 255, as previously indicated and is held in place against the face 270 by means of the annular gib 271, and suitable bolts operating in the T-slot 272 may be employed for clamping the work holder 254 in any adjusted position. The tire mold is indicated at 273 in Fig. 23 of the drawings and may be held in position by suitable clamps 274 in the usual or any preferred manner. As previously stated, the work holder 254 and supporting member 255 and hence the work or tire mold 273 may be adjusted around the pivots 258 and 259, which extend tangentially of the work holder, so that the angle of the plane of the tire mold may be changed to accommodate the work to the cutter. It is desirable to rotate the work or tire mold in its own plane to bring different portions of the tire mold into operative position and for this purpose, the annular work holder 254 is provided with an inwardly extending annular flange at 275 to which there is secured an annular worm gear 276, by means of the bolts or screws 277. In order that adjustment may be made for wear between the worm gear and worm screw, the gear is preferably made up of two pieces, one of which 278 may be adjusted circumferentially with respect to the other and thereby eliminate play or lost motion between the gear and the worm. The worm 279 (see Fig. 25) is preferably mounted upon a shaft 280 passing axially through the tubular bearings 258 and 259, about which the work holding member 255 may be rotated, as previously described. Suitable bearings 281 are mounted in the tubular spindles 258 and 259 for the shaft 280 and thrust ball bearings 282 and 283 are provided for taking the thrust of the worm, the right end of the shaft 280 is preferably provided with a miter gear 284 secured thereto and meshing with another miter gear 285 secured to a shaft 286 rotatably supported in bearings in the bracket 257, the latter being provided with extensions 287 and 288 for this purpose, as indicated in Fig. 25 of the drawings. The shaft 286 extends at right angles to the shaft 280 and the outer end thereof is provided with a hand wheel 289 and carries a pinion 290, adapted to mesh with a change-gear 291, as indicated in Fig. 25 of the drawings. The change-gear 291 is removably secured to a pinion 292 and the latter meshes with a gear 293 rotatably mounted on a fixed shaft or stud 294 mounted on the bracket 257 as indicated in Fig. 25 of the drawings. Secured to the gear 293 by bolts 295 is an index plate 296 which, in the present instance, is shown as provided with two notches 297 adapted to cooperate with a pin 298, which as indicated in Fig. 26 of the drawings is held in engagement with one of the notches by means of a spring 299, the pin being mounted in a fixed extension 300 of the bracket 257, as more particularly seen in Figs. 26 and 27 of the drawings. The change-gear 291 and pinion 292 are rotatably mounted on a stud 301, projecting laterally from a hand lever 302 pivotally mounted on the stud 294, so that the pinion 292 may be revolved about the gear 293 and remain in mesh therewith in any position. By this means, it will be understood that gears of different size may be substituted for the change-gear 291 and in this way, the number of divisions in the complete circumference of the tire mold blank may be varied according to requirements and the spacing thereof made accurate by means of the index plate 296. Obviously, additional notches 297 may be placed in the index plate 296 when required. A segmental slot 303 in the pivoted hand lever 302 is provided for cooperation with a clamping nut or bolt 304, so that the lever 302 may be rigidly held in position when the proper change-gear 291 has been placed on the stud 301 and the gear adjusted into mesh with the hand wheel pinion 290.

The cutter bar 38, as shown in Figs. 1, 2 and 29, is provided near its free end with a laterally extending bracket 305, secured to the bar in any suitable manner and formed in the shape of a box or casing with bearings in which a shaft 306 is rotatably supported. The shaft 306 carries a pinion 307 meshing with a rack 308 held in engagement therewith by means of a stirrup 309 supported upon the shaft 306, as indicated in Fig. 29 of the drawings. The rack 308, as will be seen in Figs. 1 and 28 of the drawings, is pivotally connected at 310 with the lower end of the tracer arm 223 by the bolt 311, as indicated in Fig. 28 of the drawings. It will thus be seen that by rotating the shaft and pinion 306—307 the rack 308 may be moved in either direction and hence the tracer arm 223 may be moved correspondingly and since the tracer arm 223 and the cutter arm 136 are pivotally connected together through the link 239, both the tracer and cutter will be moved in unison by a rotation of the shaft 306. For rotating the shaft 306 we preferably provide a hand wheel 312, secured to a short shaft 313 in axial alignment with the shaft 306, the inner end of the shaft 313 being pinned at 314 to a tubular shaft or member 315, surrounding the end of the shaft 306, as indicated in Fig. 29 of the drawings. The tubular shaft 315 is rotatable upon the shaft 306 and carries a pinion 316 meshing with a gear 317 secured to a tubular shaft or hub 318 carrying a pinion 319, meshing with a gear 320, keyed to the shaft 306. The gear 317 and pinion 319 are rotatably and slidably mounted on a rod 321 and collars 322 and 322$^a$ are mounted on each side of pinion 316 to engage the gear 317, so that when the tubular member 315 is slid longitudinally of the shaft 306, the gear and pinion 317—319 are moved along the rod until the pinion 319 is out of mesh with the gear 320. The gear 320 is provided with a hole or socket at 323 adapted to be engaged by a pin 324, thereby locking the tubular shaft 315 to the shaft 306, so that the hand wheel 312 may rotate the shaft 306 and pinion 307 directly. In this manner, it will be seen that two feeding speeds are obtained by the back gear arrangement, just described. In the position of the gears, as shown in Fig. 29, it will be seen that the rotation of the pinion 307 is effected through reducing gears and pinions so that two or more rotations of the hand wheel 312 may be required for one rotation of the pinion 307. The shaft 313 may preferably be provided with a collar 325 cooperating with a spring pin or plunger 326 for holding the hand wheel shaft 313 in either the position shown in Fig. 29 or in position for the pin 324 to engage the socket 323 and give the direct drive of the pinion by means of the hand wheel. It will thus be seen that by means of the hand wheel 312, through the pinion 307 and the rack 308, the tracer arm 223 and cutter arm 136 are moved simultaneously in the same plane for the longitudinal feed or to carry the cutter over the work while the tracer follows the pattern, thereby reproducing in the work the form and shape of the pattern.

It is also necessary in order to reproduce the entire pattern to provide for transverse feed of the cutter and tracer so that each successive longitudinal feed will pass over a new line and thus cover the entire area of the pattern. For this purpose, as has previously been explained, the cutter bar 38 is movable in a horizontal plane by means of the supporting rod 52 carried in the brackets 53 and sliding on the rod 54, as more particularly shown in Fig. 10 of the drawings. Attached to the frame 53 is a rack 327, with which a pinion 328 meshes, the latter being secured to the end of a shaft 329 extending substantially parallel with the cutter bar 38 and rotatably mounted in bearing brackets 330 and 331 on the rear side of the table 241, which supports the pattern as previously described. In one form of our cross feed mechanism we have arranged for the cross feed to be operated electro-magnetically each time the longitudinal feed of the tracer and cutter is reversed by rotating the hand wheel 312, (see Fig. 29). As will be seen in Fig. 33 of the drawings, the pinion shaft 329 is provided with a hand wheel 332 by which the cross feed may be operated by hand when so desired. However, for automatic operation of the cross feed, we preferably provide a ratchet wheel 333 keyed to the shaft 329 in the fork of a lever arm 334 pivotally supported upon the end of the shaft, as indicated in Fig. 33 of the drawings. In the crotch of the forked lever arm 333, there is mounted a pawl 335 (see Fig. 31) secured to a spindle 336 rotatably mounted in the lever arm 334 and preferably provided with a knurled head 337 so that the position of the pawl 335 may be changed. It will be noted that the pawl 335 is provided with two operating noses or prongs, one or the other of which may be brought into engagement with the teeth of the ratchet wheel 333 by rotating the shaft or spindle 336. In this manner, the direction of feed of the ratchet wheel may be reversed. A spring pressed ball 338 cooperates with sockets 339 in the rear side of the pawl 335 so as to hold the latter in operative engagement with the ratchet wheel 333, for either direction of feed, a socket being also provided for holding the pawl in neutral position with both noses of the pawl out of engagement with the ratchet wheel during which time it will be understood that the feed may be controlled by the hand wheel 332. The pawl lever 334 is pivotally connected to a link 340 by means of a bolt 341, which may be adjustably clamped in a radially extended T-slot 342, in the lever 334, as indicated in Fig. 33 of the drawings, thereby providing means for adjusting the throw of the pawl and hence the feed of the ratchet wheel. The link 340 is also pivotally connected at 343 with a rock arm 344 (see Fig. 32) secured to a shaft 345, extending transversely through a box-like casing 346 secured on the under-side of the pattern table 241, as will be seen in Figs. 1 and 32 of the drawings.

Secured to a rock shaft 345 is an arm provided with an armature 347, in position to cooperate with the pole 348 of an electromagnet 349 to rock the shaft 345 and hence move the rock arm 344 for operating the pawl 335 for the cross or transverse feed of the cutter bar 38. A spring 350 cooperating with an arm 351, projecting laterally from the shaft 345 is adapted to retract the armature 347 after the shaft has been rocked by the electro-magnet. An upwardly extending lug 352 is provided on the shaft 345 for cooperation with the end of a rod 353 for limiting the outward throw of the armature 347 and rock arm 344, under the action of the spring 350, as indicated in Fig. 32 of the drawings. The outer end of the rod, as will be seen in Fig. 34, is screw threaded at 353ª and a hand lever 355 is secured thereto for rotating the rod and thereby permitting the armature to recede from the magnet a greater or less distance to vary the throw of the pawl arm, thus providing additional means for regulating the amount of transverse feed. The threaded end 353ª of the rod 353 passes through a nut supported in a bracket 354 secured to the table 241, (see Figs. 33 and 34). Pins 356 may be provided for cooperation with a lug 357 on the heel of the hand lever 355 for limiting the rotative throw of the latter.

The electro-magnet 349 is preferably arranged to be actuated by a contact switch member 358 frictionally mounted on a collar 359, secured to the shaft 306 by a key 360 as will be seen in Figs. 29 and 30 of the drawings. The mounting of the contact member 358 is in the form of a split collar held together by screws 361 under the heads of which springs 362 are interposed so that the split collar is frictionally held on the collar 359, thereby permitting rotation of the shaft 306 for longitudinal feed of the tracer and cutter. One end of a wire 363, forming the circuit with the electro-magnet 349, is connected under the screw 364 with the contact nose 365 on the lower free end of the member 358, as indicated in Fig. 30 of the drawings. Another contact member 366 is secured to a plate of insulating material 367 held by springs 368 in resilient contact with lugs or buttons 369 secured to the base 370, which, as will be seen in Fig. 29, is mounted on an extension 371 of the bracket 305 (see Fig. 29). The other end 372 of the wire forming the circuit to the electro-magnet 349 is connected to the contact member 366 by the bolt or screw 373. From this arrangement it will be seen that when the shaft 306 is rotated by the hand wheel 312 for longitudinal feed of the tracer and cutter, the friction between the collar 359 and member 358 will cause the member 358 to be moved toward the right, as indicated in Fig. 30 of the drawings, thereby bringing the contact member 365 into engagement with the contact member 366 to complete the circuit through the electro-magnet 349, and the latter will operate the rock arm 344 and through the link 340 will move the pawl 335 and rotate the ratchet wheel 333 for the transverse feed of the cutter bar 38. The contact member 365 will pass over the contact member 366, the latter moving out of the way under the tension of the spring 368. Continued motion of the shaft 306 will carry the member 358 to a position at the right corresponding to its position at the left, as indicated in Fig. 30. Continued rotation of the shaft 306 will be permitted by the friction connection between the member 358 and collar 359. When the hand wheel 312 is rotated in the opposite direction to reverse the longitudinal feed of the tracer and cutter, the contact member 358 will be swung in the opposite direction and, by contact with the member 366 will again close the circuit through the electro-magnet 349 for the transverse feed of the cutter bar.

Instead of the electro-magnetic cross-feed controlled by the hand wheel 312, which operates the longitudinal feed of the tracer and cutter, we may preferably employ a mechanical feed operated automatically when the cutter bar 38 is brought into operative position. In Figs. 35 to 39, we have shown our improved mechanism, the corresponding parts of the machine being numbered the same as in the previous description. The rack 327 which, as previously stated, is secured to the reciprocating frame 53 (see Fig. 10) has meshing therewith the pinion 328 secured to the shaft 329, which may be rotated by the hand wheel 332, as previously described. In the form shown in Fig. 35, the shaft 329 is supported on the pattern table 241, by the brackets 330 and 331, substantially as shown in Fig. 33, but in this form of device, a spiral gear 374 is secured to the shaft 329 and meshes with a similar spiral gear 375 on an auxiliary shaft 376 located below the shaft 329 and supported in a pivoted arm or bracket 377. The bracket 377, as indicated in Figs. 36 and 39, is pivotally mounted on a bolt or stud 378 projecting outward from a plate 379 secured to the end of the table 241, the object of pivoting the bracket 377 being to permit dropping the spiral gear 375 out of mesh with the pinion or gear 374 and thereby leaving the shaft 329 free to be rotated by the hand wheel 332. A spring pin 380 is slidably mounted in the arm 377 and is adapted to enter a socket at 381 to hold the spiral gear 375 in mesh with the gear 374, when it is desired to actuate the cross feed by the ratchet and pawl. A stop pin 382 limits the downward movement of the arm 377 when the pin 380 is withdrawn. The ratchet wheel and its actuating arm are substantially the same as shown in Fig. 33 and operate in substantially the same manner, the corresponding parts being given the same numbers and need not be again described. A spring 383 is shown as attached to the arm 334 in Fig. 35 of the drawings for returning the pawl arm to normal position and corresponds in its action to the spring 350 shown in Fig. 32 of the drawings. In the form shown in Fig. 35, the connecting rod 340 is pivotally secured by a suitable bolt 384 in a slot 385 in the lower end of a bell crank lever 386 pivoted in a bracket 387 secured to the side of the table 241, substantially as indicated in Figs. 35 and 36 of the drawings. In order to regulate the throw of the bell-crank lever 386, we preferably provide a knurled rotatable pin 388 mounted in the bracket 387 and provided with two flattened faces, one or the other of which may be brought into position to limit the downward movement of the lever 386 and in this manner two different feeds may be given to the ratchet wheel 333 without otherwise changing the adjustments of the connecting parts. The bell-crank lever 386 is pivotally connected at 389 with a link 390, the lower end of which is pivotally connected by a bolt 391 to the outer end of the rock arm 108 secured to the shaft 103, previously described, and shown in Figs. 3 and 10 of the drawings, as connected by the link 109 with the foot treadle 110. The lower end 392 of the link 390 may preferably be provided with a plurality of holes 393 for cooperation with the bolt 391 so that the position of the crank arm 108 may be changed relatively to the bell-crank 386. It has previously been described that the knurled stop pin 388 is adapted to limit the downward movement of the bell-crank lever 386 and since the treadle 110 through the roller arm 104—105, as will be seen in Fig. 10 of the drawings, is adapted to control the position of the cutter bar and hold the cutter and tracer in operative position, it is desirable to permit additional movement of the treadle over the amount that might be necessary to operate the bell crank 386. To accomplish this, the connecting link 390—392 is preferably formed of two parts and a spring 394 is interposed therebetween, so that the link becomes extensible. This is accomplished by forming the upper part of the link 390 tubular at 395 and placing therein a tubular thrust member 396 secured thereto by a bolt 397, the spring 394 being located between the member 396 and the head of a bolt or rod 398 threaded at 399 into a turned down or cylinderical portion 400 secured to the end 392 as indicated in Fig. 35 of the drawings. By this arrangement, it will be seen that the tension of the spring 394 may be adjusted so that when the treadle 110 is operated, the spring 394 is strong enough to operate the bell-crank lever 386 and the pawl arm 334 to operate the ratchet wheel 333 and rotate the pinion 328 and give the transverse or cross feed to the cutter bar 38 at each time the treadle is operated, and the treadle may be moved on down to hold the cutter bar 38 in operative or working position.

The operation of our improved machine should be readily understood from the foregoing description, but briefly may be summarized as follows:—

The pattern is secured in place on the table 241 and the annular tire mold blank 273 is secured on the work holding member 254, which may be rotated by means of the worm 279 and hand wheel 289 in connection with the indexing device as shown in Fig. 25 of the drawings, the latter being adjusted or the change gears selected to properly divide the tire mold blank into the predetermined number of parts necessary for the complete tire mold. The cutter and tracer are moved for the longitudinal feed by means of the hand wheel 312 and the feed may be either fast or slow according to the position of the back gears as shown in Fig. 29 of the drawings. The cutter bar 38 may be brought into operative position with the tracer in contact with the pattern and the cutter operating on the work, by means of the treadle 110 operating through the rock arm 104 on the lug 102 of the slide 100 as shown in Fig. 10 of the drawings, and the operator by feel and the pressure of the foot on the treadle can keep the tracer and cutter firmly in operative position, so that heavy cuts may be taken and the machine operated at high speed. Simultaneously with the operation of the foot treadle 110, by means of the link 390 and the bell-crank 386, the ratchet feed, as shown in Fig. 35 of the drawings, may be operated to rotate the pinion 328 and move the rack 327, and, thereby the transverse feed of the cutter bar 38 may be obtained automatically, independently of the longitudinal feed and is at all times under the control of the operator. The transverse feed may also be operated in connection with the shaft 306 and hand wheel 312 according to the electro-magnet operating device as shown in Figs. 29 to 33 of the drawings, although for most purposes, the treadle operated cross feed is found to be preferable.

While we have shown our improvements in connection with a tire mold engraving machine, it will be understood that many of the improvements may be adapted for and utilized in connection with other types of engraving machines and in connection with some types of milling machines and lathes or other machines, in which the duplication of parts is effected by a tracer following a pattern while the cutter reproduces the pattern in the work. Obviously, therefore, we do not wish to be limited to the specific details of construction shown and described, for various modifications may be made therein, in adapting our improvements to other types, sizes and varieties of machines, without departing from the spirit and scope of the invention.

We claim:—

1. In a machine of the character described, the combination with a cutter bar pivoted at one end, of a bracket mounted upon and projecting above said cutter bar for pivotally supporting an arm carrying the cutter, a second bracket mounted upon and projecting above said cutter bar for pivotally supporting an arm carrying the tracer and a link connecting the cutter and tracer arms for moving them in unison, the relative lengths of said cutter and tracer arms being proportional to the distance of the pivots of the respective arms from the pivot of the cutter bar, said arms being on the respective brackets so that a line through the tracer and cutter points is substantially parallel with said cutter bar.

2. In a machine of the character described, the combination with a cutter bar, pivotally mounted at one end for vertical and horizontal movement, of a bracket extending upward from the bar and pivotally supporting an arm carrying the cutter, a second bracket extending upward from said bar, and pivotally supporting an arm carrying the tracer, the pivots of said arms being in line with the pivot of said cutter bar and at distances therefrom proportional to the reduction in size between the pattern and work, a link between the cutter and tracer arms and manual means mounted on said cutter bar for simultaneously moving said cutter and tracer arms.

3. In a machine of the character described, the combination with a cutter bar, pivotally supported at one end for horizontal and vertical movement, means for mounting the cutter bar and said pivotal supports for rotating the bar angularly, and a worm and gear for rotating and holding said cutter bar in any desired angular position.

4. In a machine of the character described, the combination with a cutter bar, of pivotal means at one end thereof, for permitting the cutter bar to swing vertically and horizontally, a pivotal support for said vertical and horizontal pivotal means for permitting said bar to be moved angularly, a head in which said last named pivotal support is mounted, a pillar for adjustably supporting said head and screw connections therebetween, whereby the pivotal end of the cutter bar may be adjustably raised and lowered.

5. In a machine of the character described, the combination with a cutter bar, pivotally supported at one end for vertical and horizontal movement about the respective pivots, a bracket secured to the free end of said cutter bar, a universal joint in said bracket for permitting said movements of the cutter bar, a rod on which said universal joint is vertically slidable to facilitate guided vertical movement thereof, and means for moving said rod bodily to vary the horizontal position of said cutter bar, the cutter bar swinging from its pivoted end.

6. In a machine of the character described, the combination with a cutter bar, of brackets thereon for supporting respectively, the cutter and tracer, pivotal supporting means at one end of said bar for permitting vertical and horizontal movement of the free end of the bar, said vertical and horizontal pivotal means being mounted on a pivotal member for angular movement of the whole bar and counterweights connected with the free end of said cutter bar through a universal joint for permitting the three movements thereof as specified.

7. In a machine of the character described, the combination with a cutter bar pivotally supported at one end, of brackets mounted thereon for supporting the cutter and tracer, said cutter bar being mounted for horizontal, vertical and angular movement, a post adjacent the free end of said cutter bar, a rocking beam swivelly supported at the upper end of said post, a connecting link between one end of said beam and the free end of said cutter bar and a counter-weight at the other end of said beam for balancing said cutter bar.

8. In a machine of the character described, the combination with a cutter bar, pivotally mounted at one end for movement horizontally, vertically and angularly, of a counter-weight connected with the free end of said cutter bar for balancing the same, manually operated means for adjusting said counter-weight to vary the vertical position of said cutter bar, and means for locking or holding the bar in the adjusted position.

9. In a machine of the character described, the combination with a cutter bar, pivotally mounted at one end for movement horizontally, vertically and angularly, of a counter-weight connected with the free end of said cutter bar for balancing the same, and a foot treadle, adapted to be operatively connected with the free end of said cutter bar for holding the cutter bar in operative position.

10. In a machine of the character described, the combinatoin with a cutter bar, pivotally mounted at one end for movement, horizontally, vertically and angularly, of a rock beam pivotally mounted in a swivelling support above said cutter bar, a bracket extending from the swivelling support of said beam, a connecting link between one end of said beam and the free end of said cutter bar, a manually operable lever mounted on said bracket and a link connection between said lever and said beam for manually raising and lowering said cutter bar.

11. In a machine of the character described, the combination with a cutter bar, mounted for movement horizontally, vertically and angularly, of a counter-weight connected with the free end of said cutter bar, a manually operated lever operatively connected to move said counter-weight and the cutter bar, and means cooperating with said lever for locking the same against movement and holding the cutter bar out of operative position.

12. In a machine of the character described, the combination with a cutter bar, mounted for movement horizontally, vertically and angularly, of a counter-weight connected with the free end of said cutter bar, manual means for raising and lowering said cutter bar, the weight of the cutter bar being slightly in excess of the counter weight, and a foot treadle adapted to be connected with the cutter bar for positively holding the cutter bar in operative position.

13. In a machine of the character described, the combination with a cutter bar, pivotally mounted at one end on horizontal and vertical pivots, for vertical and horizontal swinging movement of the free end of the bar, said bar being located above the horizontal pivot and at one side of the vertical pivot, a trunnion member supporting the first named pivotal mountings of the cutter bar, and extending at right angles thereto, and a counter-weight connected with said trunnion member for counteracting the off-center effect of said cutter bar.

14. The mechanism as claimed in claim 13, in which the trunnion member carrying the counter-weight, is provided with a worm gear segment cooperating with a worm for manually rotating said cutter bar to different angular positions.

15. In a machine of the character described, the combination with a cutter bar, pivotally mounted at one end for horizontal and vertical movement of the other end thereof, means respectively for pivotally supporting the cutter and tracer on said cutter bar for swinging movements thereof proportional to the size of the work and pattern, supports upon which the work and pattern, respectively, are mounted, a counter-weight for lifting the swinging end of said cutter bar, and means under the control of the operator for counteracting the effect of said counter-weight and holding the cutter and tracer in positive engagement respectively with the work and pattern.

16. The mechanism as claimed in claim
15, in which the means for holding the cutter and tracer in engagement with the work and pattern comprises a foot treadle, normally disconnected from but adapted when actuated to be operatively connected with the cutter bar.

17. In a machine of the character described, the combination with a cutter bar, pivotally mounted at one end for vertical and horizontal movement of the free end thereof, of a gimbal secured to the free end of said cutter bar and slidably mounted on a vertically disposed rod, a bracket supporting said rod and slidably mounted on a second rod extending at right angles to the first named rod and transversely of said cutter bar, and a rack and pinion for sliding said bracket and thereby moving the free end of the cutter bar horizontally.

18. The mechanism as claimed in claim
17, in which the transveresly disposed rod, upon which said bracket slides, is supported and adjustably mounted on a pillar, extending upward from the base of the machine, whereby the elevation of said rod above the base of the machine may be varied.

19. The mechanism as claimed in claim 17, in which said rack and pinions are operated by a ratchet and pawl, for giving a step by step transverse or horizontal feed to said cutter bar.

20. In a machine of the character described, the combination with a cutter bar, pivotally mounted at one end, of means for moving the free end of said bar horizontally for the transverse feed thereof, comprising a movable rack, operatively connected with said cutter bar, a pinion engaging said rack, a ratchet and pawl for rotating said pinion, and means under the control of the operator for operating said ratchet for a step by step cross feed of the cutter bar.

21. The mechanism as claimed in claim 20, in which the means under the control of the operator for the step by step cross feed of said cutter bar, comprises a foot treadle operatively connected with said pawl.

22. In a machine of the character described, the combination with a cutter bar, pivotally mounted at one end for permitting horizontal and vertical movements of the free end thereof, a sliding universal connection at the free end of said cutter bar, a rack operatively connected through said universal connection for moving the cutter bar horizontally for the transverse feed thereof, a pinion operating in said rack, a ratchet wheel cooperating with a pawl for rotating said pinion to give a step by step cross feed of the cutter bar, a foot treadle operatively connected with said pawl for effecting said cross feed and means adapted to be operated by said treadle for holding the cutter bar down while operating on the work.

23. The mechanism as claimed in claim 22, in which the means operated by said treadle for holding the cutter bar down comprises a vertically slidable member connected by means of a link with the free end of said cutter bar, said slidable member being provided with an ear or lug, with which a lever arm operated by said foot treadle is adapted to engage, when the foot treadle is operated to effect the cross feed of said cutter bar.

24. In a machine of the character described, the combination with a cutter bar, pivotally mounted at one end thereof, for horizontal and vertical movement of the other end, of a tracer and cutter carried by said bar, means supporting the work for cooperation with said cutter, a table provided with means for holding the pattern for cooperation with said tracer, means for adjusting the elevation of said table relative to the work support and means for clamping the table in adjusted position.

25. The mechanism as claimed in claim 24, in which the elevation of the pivotal mounting for the end of the cutter bar is adjustable, and means is provided for securing the same in adjusted position.

26. In a machine of the character described, the combination with a cutter bar, pivotally mounted at one end on horizontal and vertical pivots, of a bracket secured to said bar, near the free end thereof, and extending vertically above the bar, a tracer arm pivotally supported from the upper end of said bracket and adapted to swing in a plane passing through the vertical pivot of said bar, a link connected with said tracer arm, and a hand wheel rotatably supported on the free end of said cutter bar for operating said link and thereby moving said tracer arm.

27. The mechanism as claimed in claim 26, in which said cutter bar is also provided with a bracket extending upwardly therefrom and pivotally supporting an arm carrying the cutter, said cutter arm swinging in the same plane with the tracer arm and connected to the latter by means of a link, whereby said hand wheel is adapted to simultaneously move both the tracer and the cutter.

28. In a machine of the character described, the combination with a cutter bar, pivotally mounted at one end, of means secured to said cutter bar, near the free end thereof, for movably supporting the tracer, and a turret head mounted upon said movable support, said turret head carrying a plurality of tracer points, any one of which may be brought into operative position as described.

29. The mechanism as claimed in claim 28, in which means is provided in connection with said turret head, for locating the respective tracer points in operative position, and for holding the turret when so located.

30. In a machine of the character described, the combination with a cutter bar, pivotally mounted at one end, of a tracer carrier, movably mounted on said cutter bar, near the free end thereof, a link connected with said tracer carrier, a rack and pinion cooperating with said link for moving the tracer carrier, a hand wheel supported in a bracket on the free end of said cutter bar for rotating said pinion, and change-speed gears between said hand wheel and said pinion for changing the number of rotations of said pinion relative to the hand wheel.

31. The mechanism as claimed in claim 30, in which the change gear for varying the relative rotation of the pinion and hand wheel is adapted to be shifted by bodily moving the hand wheel axially toward and from the cutter bar, and means for locking the hand wheel against axial movement.

32. In a machine of the character described, the combination with a cutter bar, of brackets secured thereto for supporting, respectively, carriers for the tracer and cutter, a turret on the tracer carrier, provided with a plurality of tracer points, adapted to be brought into position for use one at a time, a turret head mounted on said cutter carrier and provided with a corresponding plurality of cutters adapted to be brought into position for use one at a time, the shape of the cutters corresponding with the respective tracers.

33. The mechanism as claimed in claim 32, in which the turrets are provided, respectively, with three tracers and three cutters, said cutter turret being so arranged that only the cutter in position for use is adapted to be rotated.

34. In a machine of the character described, the combination with a cutter bar, of a bracket mounted on said cutter bar for supporting a cutter carrier, a shaft rotatably mounted in said cutter carrier for driving the cutter, a shaft in said bracket operatively connected to drive said cutter driving shaft and change speed gearing cooperating with the shaft in said bracket for providing a plurality of speeds at which the cutter may be driven.

35. The mechanism as claimed in claim 34, in which the cutter carrier also supports a back gear and direct drive clutch and means for shifting the same for an additional change in the speed of rotation of said cutter.

36. In a machine of the character described, the combination with a cutter bar, of a cutter carrier mounted thereon and provided with a longitudinally extending driven shaft, a turret head carrying a plurality of cutters adapted to be brought into operative position, one at a time, a detachable stub shaft in said turret head in axial alignment with and driven by said driven shaft for driving said cutters, and means for removably securing said turret head to the cutter carrier.

37. The mechanism as claimed in claim 36, in which the cutter carrier is provided with a shiftable clutch member and back gears cooperating with said driven shaft for varying the speed of the cutter, by direct or back gear drive of the latter.

38. In a machine of the character described, the combination with a cutter bar, of a bracket mounted upon said cutter bar and pivotally supporting a swinging arm carrying the cutter, a power driven shaft supported in said bracket, a second shaft in said bracket passing axially through said pivotal support, intermediate change gears between said shafts and gear connections between said second shaft and the cutter for rotating the latter.

39. The mechanism as claimed in claim 38, in which the gear connections between said shaft and the cutter include a plurality of shiftable gears, for changing the speed of rotation of the cutter, while the speed of rotation of said shaft remains the same.

40. The mechanism as claimed in claim 38, in which the bracket supporting said cutter arm is provided with change-speed gears for changing the speed of rotation of said shaft.

41. In a machine of the character described, the combination with a cutter bar, of a bracket mounted thereon for pivotally supporting an arm carrying the cutter, a shaft mounted in said bracket and provided with a pulley for driving the same, a second shaft mounted in said bracket in axial alignment with the pivot of said cutter arm and extending into the cutter arm, a plurality of gears of different sizes mounted on said last named shaft, intermediate shiftable gears for establishing driving connection between said pulley shaft and the second named shaft and gear connections between the second named shaft and the cutter, whereby the speed of the latter may be varied by shifting said shiftable gears.

42. The mechanism as claimed in claim 41, in which the second named shaft passing into the cutter arm is geared to a shaft passing down the cutter arm and back gears cooperating with a clutch are mounted in said cutter arm for engagement with said last named shaft for driving said cutter directly or through said back gears for changing the speed of said cutter.

43. In a machine of the character described, the combination with a cutter bar, of a bracket mounted thereon and pivotally supporting the cutter arm, a driven shaft extending longitudinally of said cutter arm, a second shaft in axial alignment with the first named shaft and removably secured thereto to rotate in unison therewith, a gear secured to the second named shaft, a plurality of pinions mounted upon taper sockets, cutters mounted in the respective taper sockets and means for bringing one or another of said pinions into mesh with said gear for driving the corresponding cutter.

44. The mechanism as claimed in claim 43, in which the plurality of pinion-carrying taper-sockets are mounted on a turret rotatable eccentrically of said shaft and the gear mounted thereon, the arrangement being such that only one of said pinions can be brought into mesh with said gear at a time.

45. In a machine of the character described, the combination with a cutter bar, of a bracket mounted thereon and pivotally supporting the cutter arm, a driven shaft extending longitudinally of said cutter arm, a turret head adapted to be removably secured to the lower end of said cutter arm, a stub shaft in said turret head in axial alignment with the shaft in said arm, adapted to be removably secured thereto when the turret head is in place, a rotatable turret mounted in said turret head eccentrically of said stub shaft, a plurality of cutters equally spaced on said turret and rotatable therewith, so that one or another may be brought into operative connection with said shaft and a centering pin slidably mounted in said arm for cooperation with sockets in said turret to position the latter with one of said cutters operatively connected with said shaft.

46. The mechanism as claimed in claim 45, in which the turret is provided with a beveled clamping ring for clamping the turret to said turret head after it has been located by said pin and socket, thereby rigidly securing the turret and turret head together.

47. In a machine of the character described, the combination with a cutter bar, of a cutter carrier movably mounted thereon, said cutter carrier being provided with a rotatable shaft for driving the cutter, said shaft extending into a socket carried by a stub shaft, the two shafts being keyed together to rotate in unison, a counter-bored socket eccentrically of said shafts, in which a turret head is removably secured, a bearing support carried by said turret head for rotatably supporting said stub shaft, a taper socket in said head, a turret rotatably mounted in said taper socket, a beveled split ring cooperating between said turret and the turret head for clamping the turret rigidly in said taper socket and manual means for loosening and clamping said split ring.

48. The mechanism as claimed in claim 47, in which said turret head is provided with three rotatable taper sockets equally spaced angularly with reference to the axis of said turret, each of said sockets carrying a pinion, and a gear on the lower end of said stub shaft, with which said socket pinions are adapted to be brought into mesh one at a time by rotating said turret.

49. In a machine of the character described, the combination with a cutter carrier, of a driven shaft carried thereby for driving the cutters, a removable turret head secured to said carrier, comprising a body portion provided with a tubular bearing, a stub shaft rotatably mounted therein and adapted to be removably connected with said first named shaft, a spur gear secured to the lower end of said stub shaft, a turret rotatably mounted in said body portion eccentrically of said stub shaft, a plurality of cutter sockets carrying pinions adapted to be brought into mesh with said gear in one position only of said turret, and means for locating and holding said turret with one of said pinions in mesh with the gear for operating the corresponding cutter from said driven shaft.

50. The mechanism as claimed in claim 49, in which the pinion carrying cutter sockets are provided with ball-bearings located on each side of the respective pinions so that the sockets and cutter shanks may be made of minimum length.

51. The mechanism as claimed in claim 49, in which the means for locating and holding said turret with one of the cutter pinions in mesh with said gear comprises a slidably mounted pin cooperating with a socket in the turret, a spring actuated latch cooperating with said pin to hold the latter out of engagement with the sockets and means carried by the rotating turret for actuating said latch to release said pin and permit engagement thereof with a socket when the corresponding cutter pinion is in proper meshing relation with said gear.

52. In a machine of the character described, the combination with a cutter carrier, of a rotatable turret mounted therein, a plurality of cutters rotatably mounted on said turret and adapted to be brought into operative position one at a time, said turret being provided with a corresponding plurality of positioning sockets, a slidable locating and holding pin mounted upon said carrier and adapted to cooperate with said sockets, manual means for moving said pin out of engagement with the sockets, a spring actuated latch cooperating with said pin to hold it out of engagement with said sockets, and a corresponding plurality of cams carried by said turret for releasing said latch by engagement therewith when said turret is rotated to bring one or another of said cutters into operative position.

53. The mechanism as claimed in claim 52, in which the locating and holding pin is spring actuated to force it into the sockets in the turret when the respective cutters are located in operative position and a rack and pinion for manually moving said pin against the action of its spring.

54. In a machine of the character described, the combination with a cutter carrier, of a rotatable turret mounted thereon, a ball-bearing shaft mounted eccentrically of said turret, a spur gear on the lower end of said shaft, a plurality of short taper-sockets, each provided with a pinion adapted to be brought into mesh with said spur gear, said taper-sockets being mounted in ball-bearings supported in said turret, the eccentricity of said turret relative to said gear being such that only one of said taper-socket pinions may be brought into mesh at a time, and a taper-shank cutter secured in each of said taper-sockets.

55. The mechanism as claimed in claim 54, in which the turret is made hollow and the lower wall thereof is removably attached thereto as a cover plate for enclosing said gear and pinions, said cover plate carrying the lower ball bearings for said taper sockets while the upper ball bearings are carried upon the body of said turret, substantially as shown and described.

56. In a machine of the character described, the combination with a support for a rotatable work holder, of pivots and bearings for pivotally supporting said work holder support entirely at one side thereof, and tangent to said work holder, said work holder support being mounted for angular movement about said pivots and manual means for adjusting the angular position of said work holder.

57. The mechanism as claimed in claim 56, in which means is provided for clamping the work holder support in its angularly adjusted position.

58. In a machine of the character described, the combination with a work holder, of an annular ring member supporting said work holder, a shaft extending tangentially of said ring member and pivotally supporting the latter, a worm carried by said shaft, a worm gear secured to said work holder and engaging said worm and means for rotating said shaft and thereby rotating the work-holder.

59. The mechanism as claimed in claim 58, in which the means for rotating said shaft and worm includes gearing and an index plate for rotating said work-holder equal predetermined amounts.

60. In a machine of the character described, the combination with a pier or platform, of a carriage slidably mounted thereon, ears or bearing lugs projecting upward from said carriage, a work holder pivotally supported by said ears, a bracket on said carriage extending upward back of said work holder, a screw mounted in said bracket and cooperating with said work-holder to move the same about said pivots for adjusting the angle of the work, and means for clamping the work holder in adjusted position.

61. The mechanism as claimed in claim 60, in which the means for clamping the work-holder comprises an arcuate slot in said bracket, and a bolt therethrough for clamping said work-holder in adjusted position.

62. In a machine of the character described, the combination with an annular tire mold holder, of an annular frame in which said mold holder is rotatably mounted, a shaft extending tangentially of said annular frame and pivotally supporting the latter, said shaft being provided with a worm, an annular worm gear secured to said tire-mold holder and engaging said worm, and a hand wheel for rotating said shaft and thereby rotating the tire mold in the holder.

63. The mechanism as claimed in claim 62 in which the hand wheel and said shaft are geared to an index plate for gaging the movement of said tire mold predetermined equal amounts according to the number of cuts required in the complete circumference of the tire mold, means being provided for changing the gear connections between said shaft and index plate for varying the number of circumferential divisions.

64. In a machine of the character described, the combination with a cutter bar, upon which the cutter and tracer are mounted, of a trunnion supporting said cutter bar at one end thereof, manually operated means connected with said trunnion for rotating the cutter bar, and thereby change the angular position of the cutter and tracer, the latter being in a plane passing through the axis of said trunnion, a work-holder pivotally mounted on pivots extending tangentially thereof, the axis of said pivots being parallel to the axis of said trunnion, and means for adjustably moving said work-holder about said pivots.

65. The mechanism as claimed in claim 64, in which said trunnion is adjustably supported on a pier, so that the elevation thereof relative to the work-holder may be varied.

66. In a machine of the character described, the combination with a cutter bar, pivotally mounted at one end for horizontal and vertical swinging movement, and carrying the cutter and tracer, of a trunnion supporting the pivoted end of said cutter bar, the axis of said trunnion being substantially parallel to a line between the cutter and tracer, manual means connected with said trunnion for rotating the same together with the cutter bar for varying the angular position of the cutter and tracer, a pier supporting said trunnion provided with means for adjusting the elevation of the trunnion and cutter bar, a table for supporting the pattern in cooperative relation with said tracer, means for adjusting the elevation of said table, a work-holder comprising an annular member to which the work may be secured, an annular support for said member, means for mounting said work-holder and support for movement transversely of the plane of the work to vary the angle thereof relative to the cutter and cutter bar and manually operated means for adjusting the angular position of said work-holder and support.

67. In a machine of the character described, the combination with a cutter bar, pivotally mounted at one end for horizontal and vertical swinging movement and for angular adjustment of the plane of the cutter and tracer, of a bracket mounted thereon for supporting a swinging arm carrying the cutter, a motor supported on said cutter bar for rotating said cutter, a shaft mounted in said bracket and operatively connected with said motor, a second shaft mounted in said bracket and operatively connected with the cutter through a shaft in said swinging arm and intermediate change-speed gears between said first named shafts for changing the speed of said cutter.

68. The mechanism as claimed in claim 67, in which the motor is operatively connected to the first mentioned shaft mounted in said bracket and said second shaft is geared to said shaft in said arm for driving the cutter, the arrangement being such as to permit swinging of the arm without interfering with the drive of the cutter.

69. In a machine of the character described, the combination with a cutter bar, of a bracket mounted thereon for supporting the tracer carrier, means for securing said bracket to the cutter bar, means for holding the tracer carrier to slide in a plane parallel to the cutter bar and a rotatable turret mounted on said carrier for supporting a plurality of tracer points.

70. The mechanism as claimed in claim 69, in which the turret is supported for rotation in a vertical plane parallel to the plane in which the carrier slides, and means is provided for locating and holding the turret with one of the tracer points in working position.

71. In a machine of the character described, the combination with a cutter bar, of a rack and pinion for moving said cutter bar for the transverse feed thereof, a ratchet and pawl operatively connected with said pinion for effecting the cross-feed and means for disconnecting the ratchet and pawl feed.

72. The mechanism as claimed in claim 71, in which means is provided for limiting the stroke of the ratchet feeding pawl and the position of the limiting means may be varied, thereby providing for a variation in the cross-feed.

73. In a machine of the character described, the combination with a cutter bar, pivotally mounted for horizontal and vertical movement of the free end thereof, of means controlled by a foot treadle for moving the cutter bar downward in a vertical plane and for holding it in working position, a rack and pinion for moving the cutter bar horizontally for the transverse feed and means connected with said treadle for operating said rack and pinion for the transverse feed when said treadle is operated to move the cutter bar downward.

74. The mechanism as claimed in claim 73, in which a resilient extensible member is interposed in the connections between said treadle and the rack and pinion for the transverse feed, whereby the amount of movement of the rack and pinion for cross-feed may be varied while permitting a full stroke of said treadle.

75. In a machine of the character described, the combination with a cutter bar, of a rack and pinion operatively connected therewith for moving said cutter bar horizontally for the transverse feed, a ratchet and pawl for rotating said pinion and a lever adjustably connected for operating said ratchet and pawl to effect transverse feed of said bar.

76. The mechanism as claimed in claim 75, in which the cutter bar is provided with a tracer mounted on a movable tracer carrier and said lever for operating the transverse feed is operated incidentally to the movement of the tracer point into working position in contact with the pattern.

77. In a machine of the character described, the combination with a cutter bar, provided with a tracer and cutter, of means mounted on the cutter bar for moving the tracer and cutter for longitudinal feed thereof, means operatively connected with the cutter bar for effecting step by step transverse feed thereof and means associated with said means for longitudinal feed for effecting said transverse feed when reversing the longitudinal feed.

JOSEPH F. KELLER.
JOHN C. SHAW.